United States Patent
Shin et al.

(10) Patent No.: US 9,684,320 B2
(45) Date of Patent: Jun. 20, 2017

(54) DC-DC CONVERTER AND METHOD FOR CONTROLLING THE SAME AND POWER SUPPLY OF ENERGY STORAGE SYSTEM INCLUDING THE SAME DC-DC CONVERTER

(71) Applicant: LG INNOTEK CO., LTD., Seoul (KR)

(72) Inventors: Bum Su Shin, Seoul (KR); Jae Sam Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/686,372

(22) Filed: Apr. 14, 2015

(65) Prior Publication Data
US 2015/0338862 A1 Nov. 26, 2015

(30) Foreign Application Priority Data
May 20, 2014 (KR) .................. 10-2014-0060606

(51) Int. Cl.
*G05F 1/46* (2006.01)
*H02M 3/158* (2006.01)

(52) U.S. Cl.
CPC ............ *G05F 1/46* (2013.01); *H02M 3/1584* (2013.01)

(58) Field of Classification Search
CPC ........................................................ G05F 1/46
See application file for complete search history.

(56) References Cited

U.S. PATENT DOCUMENTS

| 6,137,274 | A | 10/2000 | Rajagopalan | |
|---|---|---|---|---|
| 6,489,756 | B2 * | 12/2002 | Kanouda | H02M 3/156 323/272 |
| 6,836,103 | B2 * | 12/2004 | Brooks | H02M 3/1584 323/272 |
| 7,005,835 | B2 * | 2/2006 | Brooks | H02M 3/1584 323/272 |
| 7,301,314 | B2 | 11/2007 | Schuellein et al. | |
| 7,696,734 | B2 * | 4/2010 | Endo | H02M 3/1584 323/272 |
| 8,049,474 | B2 * | 11/2011 | Bernacchia | H02M 3/1584 323/272 |

(Continued)

FOREIGN PATENT DOCUMENTS

WO  03/084038 A2  10/2003

OTHER PUBLICATIONS

KIPO Office Action, mailed Jul. 30, 2015, for Korean Patent Application No. 10-2014-0060606 which corresponds to the above-identified U.S. application.

(Continued)

*Primary Examiner* — Emily P Pham
(74) *Attorney, Agent, or Firm* — LRK Patent Law Firm

(57) ABSTRACT

A DC/DC converter includes n converters connected in parallel to each other and configured to adjust a level of an input voltage according to a duty ratio of a first pulse signal applied to a first switch device to output an output voltage, wherein the n is an integer of 2 or more; and a control unit configured to compare an average of n sensing currents with the n sensing currents sensed from the converters, respectively, to adjust the duty ratio of the first pulse signal.

20 Claims, 12 Drawing Sheets

(56) References Cited

U.S. PATENT DOCUMENTS

| | | | |
|---|---|---|---|
| 8,421,432 B2* | 4/2013 | Hawkes | H02M 3/156 323/283 |
| 8,710,762 B2* | 4/2014 | Takahashi | 315/291 |
| 2003/0201761 A1 | 10/2003 | Harris | |
| 2008/0024099 A1* | 1/2008 | Oki | H02M 1/08 323/282 |
| 2010/0033154 A1 | 2/2010 | Cheng et al. | |
| 2010/0244789 A1 | 9/2010 | Osaka | |
| 2013/0293203 A1 | 11/2013 | Chen et al. | |

OTHER PUBLICATIONS

European search report for European Patent Application No. 15163994.5 corresponding to the above-referenced U.S. application.

* cited by examiner

DC-DC CONVERTER AND METHOD FOR CONTROLLING THE SAME AND POWER SUPPLY OF ENERGY STORAGE SYSTEM INCLUDING THE SAME DC-DC CONVERTER

BACKGROUND

1. Field of the Invention

The embodiment relates to a DC/DC converter.

2. Background Art

There is a need to boost a voltage from a low voltage to a high voltage or drop a voltage from a high voltage to a low voltage in a field of using power.

To this end, the study of modeling and analyzing a DC-DC converter as one among various voltage boosting and dropping converters has been performed.

The DC/DC converters may be classified into an insulation type and a non-insulation type.

The input and output of the insulation type converter may be insulated by using a transformer having a magnetic core, so that stability is secured. The voltage boosting and dropping ratios of the insulation type converter may be adjusted by adjusting a turn ratio.

The buck type converter, which is classified as one type of the DC-DC converter, includes a forward converter, a half bridge converter and a full bridge converter. The buck-boost type converter includes a flyback converter.

Specifically, since the flyback converter is operated even with only one switching device, the flyback converter may be implemented at a low cost.

In addition, when the DC-DC converter is driven, a negative feedback control unit is used to sense and control the error of an output signal of the DC-DC converter. The DC-DC converter and the negative feedback control unit may be implemented on a single chip which may be called a switch mode power supply unit.

Recently, in order to design a high-current DC-DC converter, a plurality of DC-DC converters is connected to each other so that the high-current DC-DC converter is implemented. However, when the high-current DC-DC converter is controlled, current is concentrated into one converter due to component deviation between the converters.

SUMMARY

The embodiment provides a DC-DC converter which is capable of processing a high current.

The embodiment provides a control unit for controlling a DC-DC converter capable of processing a high current.

The embodiment provides a control unit for controlling a DC-DC converter, which is capable of processing a high current, in a current mode control scheme using a triangular wave.

The embodiment provides a control unit for controlling balance between the output currents of each DC-DC converter while driving a plurality of DC-DC converters in parallel.

According to one embodiment, there is provided a DC/DC converter which includes: n converters connected in parallel to each other and configured to adjust a level of an input voltage according to a duty ratio of a first pulse signal applied to a first switch device to output an output voltage, wherein the n is an integer of 2 or more; and a control unit configured to compare an average of n sensing currents with the n sensing currents sensed from the converters, respectively, to adjust the duty ratio of the first pulse signal.

The control unit includes: a current sensing unit configured to detect and amplify the n sensing currents to output n first output voltages; an average unit configured to average the n first output voltages to output an average voltage; a current balance unit configured to compare the average voltage with the n first output voltages to output n second output voltages; and a triangular wave generating unit configured to generate n triangular waves having gradients adjusted according to each of the n second output voltages.

The current sensing unit includes first to n-th current sensing sub-units, and each of the first to n-th current sensing sub-units detects one of the n sensing currents and outputs one of the n first output voltages.

The current balance unit includes first to n-th current balance sub-units, and each of the first to n-th current balance sub-units compares the average voltage with one of the n first output voltages to output one of the n second output voltages.

The triangular wave generating unit includes first to n-th triangular wave generating sub-units, and each of the first to n-th triangular wave generating sub-units outputs one of the n triangular waves which has a gradient according to a level of one of the n second output voltages.

The control unit further includes: an error amplifier configured to compare each of the n output voltages of the n converters with a reference voltage and to amplify errors of the n output voltages to output the n control signals; and a comparator configured to compare one of the n control signals with one of the n triangular waves to control one of first switches of each of the n converters.

The control unit further includes n constant current sources configured to provide mutually different currents according to each of the n second output voltages.

The triangular wave generating unit includes: n capacitors charged with each of n constant currents output from each of the n constant current sources; n second switch devices configured to control a charge or a discharge of each of the n capacitors; and a triangular wave control unit configured to control the n second switch devices to be turned on or off.

The triangular wave control unit controls one of the n second switch devices based on one of charged voltages of the n capacitors and one of the n control signals.

The triangular wave is a voltage between both terminals of the capacitor.

According to another embodiment, there is provided a DC/DC converter which includes: a plurality of converters connected in parallel to each other and configured to adjust a level of an input voltage according to a duty ratio of a first pulse signal applied to a first switch device to output an output voltage; current sensing units configured to amplify sensing voltages by output currents of the converters flowing through a sensing resistor in order to output first output voltages; and current balance units configured to amplify a differential signal between an average voltage of the first output voltages and one of the first output voltages in order to output second output voltages, wherein the duty ratio of the first pulse signal is controlled according to levels of the second output voltages.

Each of the current sensing units includes: a first amplifier configured to non-inverting amplify the sensing voltage; and a second amplifier configured to amplify a differential signal between an output of the first amplifier and the sensing signal.

Each of the current balance units includes a third amplifier configured to amplify a differential signal between an output voltage of the second amplifier and the average voltage.

The DC/DC converter further includes a constant current source configured to output a constant current based on an output voltage of the third amplifier.

The DC/DC converter further includes a triangular wave generating unit configured to generate a triangular wave by the current output from the constant current source.

The duty ratio of the first pulse signal is controlled according to a gradient of the triangular wave output from the triangular wave generating unit.

The triangular wave generating unit includes: a capacitor charged with the current output from the constant current source; a second switch device connected to the capacitor and configured to connect the capacitor to a ground to discharge the capacitor; and a triangular wave control unit configured to control the switch device.

The triangular wave control unit is configured to turn on or off the second switch device according to the charged voltage of the capacitor.

The DC/DC converter further includes an averaging unit configured to generate the average voltage, and wherein the average unit includes a buffer configured to average the first output voltages to output the average voltage.

According to still another embodiment, there is provided a power supply of an energy storage system including a DC-DC converter, which includes: n converters connected in parallel to each other and configured to adjust a level of an input voltage according to a duty ratio of a first pulse signal applied to a first switch device to output an output voltage, wherein the n is an integer of 2 or more; and a control unit configured to compare an average of n sensing currents with the n sensing currents, respectively to adjust the duty ratio of the first pulse signal, wherein the n sensing currents are sensed from each of the converters.

The embodiment provides a DC-DC converter which is capable of processing a high current, and a control unit for controlling a DC-DC converter. In addition, the embodiment provides a control unit for controlling a DC-DC converter, which is capable of processing a high current, in a current mode control scheme using a triangular wave. The embodiment provides a control unit for controlling balance between the output currents of each DC-DC converter while driving a plurality of DC-DC converters in parallel, so that the consumed power may be reduced when the output currents of the DC-DC converters are sensed.

DETAILED DESCRIPTION OF THE EMBODIMENTS

Figure 1:
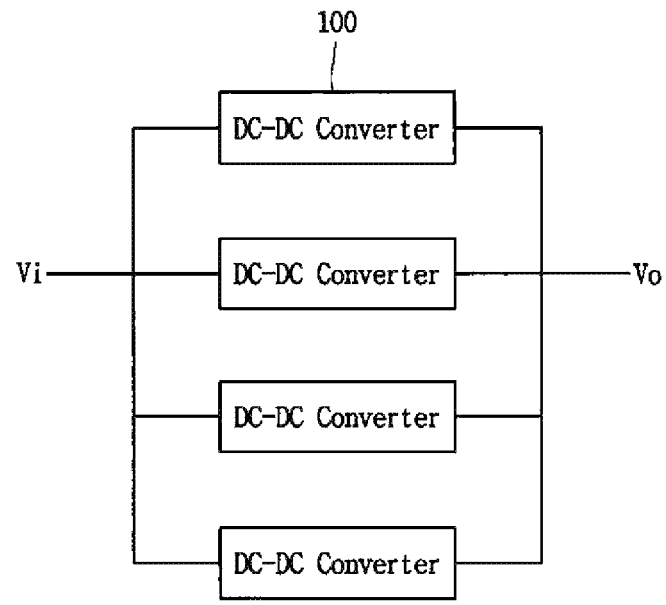
FIG. 1 is a circuit diagram showing a DC/DC converter according to an embodiment of the present invention.

Hereinafter, a multiple output converter according to an embodiment will be described with reference to accompanying drawings. Although embodiments have been described with reference to a number of illustrative embodiments thereof, it should be understood that numerous other modifications and embodiments can be devised by those skilled in the art that will fall within the spirit and scope of the principles of this disclosure. The thickness and size of an apparatus shown in the drawings may be exaggerated for the purpose of convenience or clarity. The same reference numerals denote the same elements throughout the specification.

FIG. 1 is a circuit diagram showing a DC-DC converter according to an embodiment.

An embodiment may include a plurality of DC-DC converters 100.

The DC-DC converter 100 may change a level of an input power Vi based on a control signal to provide an output voltage Vo to an output terminal. The plurality of DC-DC converts 100 may be connected in parallel to each other between an input terminal of the input power Vi and the output terminal of the output power Vo and may be driven in parallel. A single input power Vi may be branched to be input to the plurality of DC-DC converters 100, and the voltages Vo output from each of the DC-DC converters 100 may be output to a single output terminal. That is, the DC-DC converters 100 may individually process the input power Vi to output a single output voltage Vo.

When a single DC-DC converter is used to design a high-current DC-DC converter, the sizes of devices in the single DC-DC converter and the complexity may be increased. However, according to the embodiment, the plurality of DC-DC converters 100 are connected in parallel to each other so that the values of currents processed by each of the DC-DC converters 100 may be reduced. Thus, a high output of power may be obtained while preventing the sizes of the devices in the DC-DC converters 100 from being excessively increased without causing the circuit complexity.

The DC-DC converter 100 may obtain a desired level of output power Vo from raw input power Vi through a predetermined process. To this end, a control is required to obtain the desired output power Vo. Specifically, even in case that the input voltage Vi and the load current are changed, a control is required to obtain a well-adjusted output voltage Vo.

A scheme of controlling the DC-DC converter 100 is classified into a voltage mode control scheme and a current mode control scheme.

<Voltage Mode Control Scheme>

Figure 2:
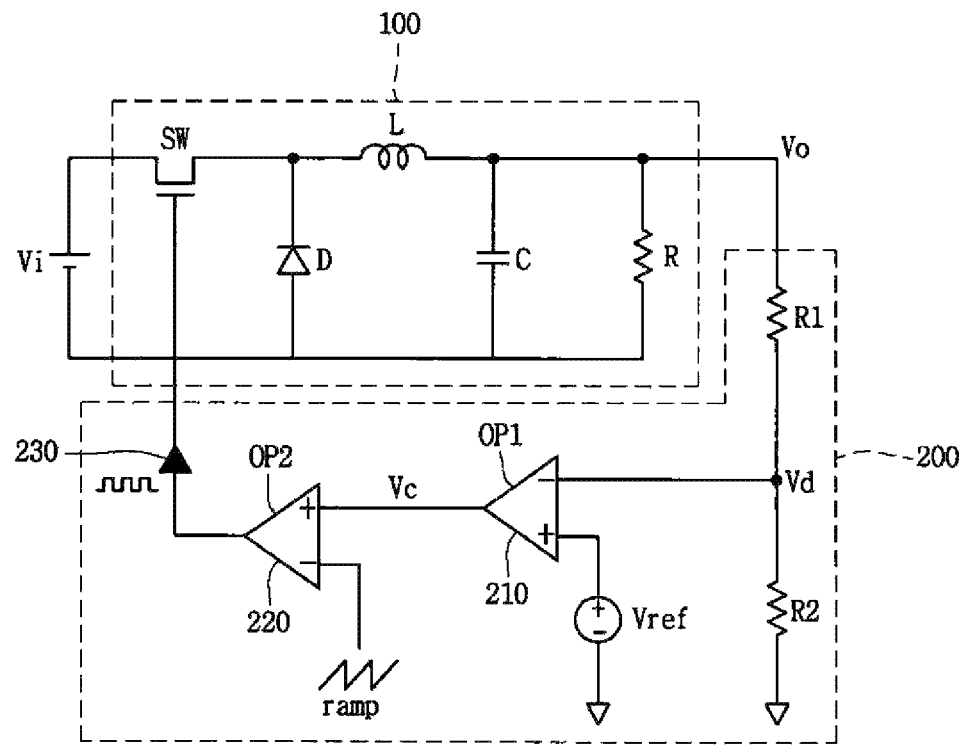
FIG. 2 is a circuit diagram illustrating a voltage mode control scheme of a DC-DC converter.
Figure 3:
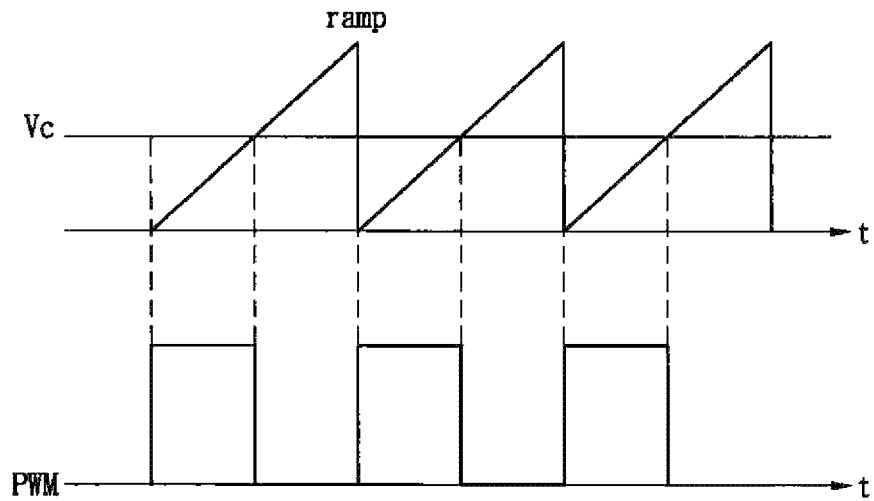
FIG. 3 is a waveform diagram illustrating a driving waveform of a control signal of FIG. 2.

FIG. 2 is a circuit diagram illustrating a voltage mode control scheme of a DC-DC converter, and FIG. 3 is a waveform diagram illustrating a driving waveform of a control signal of FIG. 2.

First, a voltage mode control scheme will be examined with reference to FIGS. 2 and 3. As one example, a buck type DC-DC converter 100 will be described.

In the buck type converter, the output voltage Vo is lower than the input voltage Vi.

The voltage mode control type DC-DC converter 100 may include an L-C (inductor-capacitor) filter including a diode D, an inductor L and a capacitor C, a load resistor R and a switch device SW.

The switch device SW may include a transistor controlled by a control unit 200, where one terminal of the switch device SW is connected to one terminal of an input power source Vi and another terminal is connected to the cathode of the diode D. One terminal of the inductor L may be connected to the cathode of the diode, and the other terminal may be connected to one terminal of the capacitor. The other terminal of the capacitor may be connected to the anode of the diode and the other terminal of the input power source Vi. The load resistor R may be connected in parallel to the capacitor C.

The output voltage of the DC-DC converter 100 is fed back to the control unit 200 according to the voltage mode control scheme, so that the control unit 200 may generate a PWM (Pulse Width Modulation) signal for controlling the switch device SW of the DC-DC converter 100.

The control unit 200 may include an error amplifier 210, a comparator 220 and a switch driving unit 230.

The error amplifier 210 amplifies an error of the output voltage Vo of the DC-DC converter 100 based on a divided voltage obtained by voltage-dividing the output voltage Vo through first and second resistors R1 and R2 in order to output a control voltage Vc.

The error amplifier 210 may include a first operational amplifier OP1, where the output voltage Vo of the DC-DC converter 100 is applied to the inverting terminal of the first operational amplifier OP1 through the first and second resistors R1 and R2 and a reference voltage Vref is applied to the non-inverting terminal of the first operational amplifier OP1.

The error amplifier 210 compares the output voltage Vo, which is provided through the first and second resistors R1 and R2 from the DC-DC converter 100, with the reference voltage Vref to output an error as the comparison result and amplifies the error. Then, the amplified error is input to the comparator 220.

The comparator 220 generates a square wave pulse (PWM) as shown in FIG. 3 based on the control voltage Vc from the error amplifier 210.

The comparator 220 may be implemented with a second operational amplifier OP2, where the control voltage Vc from the error amplifier 210 is applied to the non-inverting terminal of the second operational amplifier OP2 and a ramp signal is applied to the inverting terminal of the second operational amplifier OP2.

The comparator 220 may compare the ramp signal and the control voltage Vc from the error amplifier 210 with each other to generate the square wave pulse for driving the DC-DC converter 100. Thus, the control unit 200 controls the pulse width corresponding to the output error of the DC-DC converter 100, so that the output voltage Vo of the DC-DC converter 100 may be stabilized.

The switch driving unit 230 may drive the DC-DC converter 100 based on the square wave pulse which is an output signal of the comparator 220. That is, the switch-on and -off of the switch device included in the DC-DC converter 100 is controlled, so that the preset voltage (desired output voltage Vo) of the DC-DC converter 100 may be constantly maintained.

Referring to FIG. 3, a relationship between the duty radio of the PWM signal and the control voltage Vc and the ramp signal may be understood. When the level of the ramp signal is equal to or less than that of the control voltage Vc, a high PWM signal is output. When the level of the ramp signal is higher than that of the control voltage Vc, a low PWM signal is output. In this case, when a frequency of the ramp signal is controlled, the on-time and off-time of the PWM signal may be varied. Thus, the switching frequency of the DC-DC converter 100 may be determined by controlling the frequency of the ramp signal.

<Current Mode Control Scheme>

Figure 4:
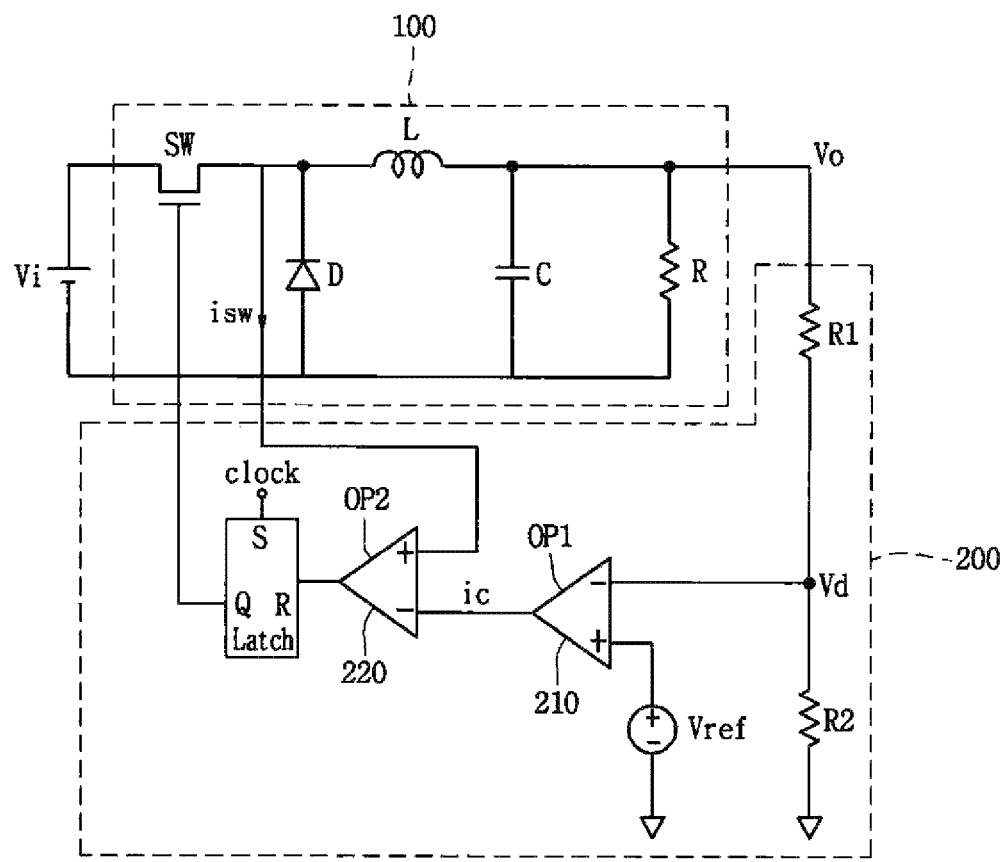
FIG. 4 is a circuit diagram illustrating a current mode control scheme of a DC-DC converter.
Figure 5:
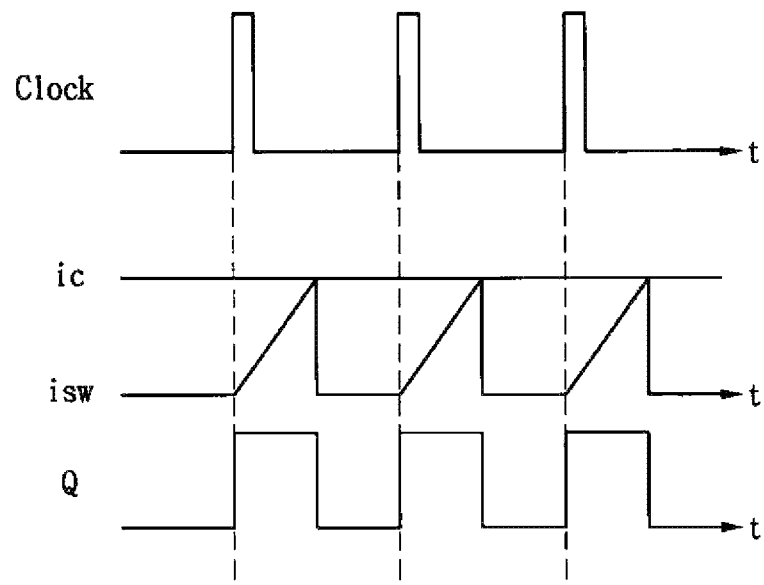
FIG. 5 is a waveform diagram illustrating a driving waveform of a control signal of FIG. 4.

FIG. 4 is a circuit diagram illustrating a current mode control scheme of a DC-DC converter, and FIG. 5 is a waveform diagram illustrating a driving waveform of a control signal of FIG. 4.

The current mode control scheme is a control method of switching on a switch with a clock of a predetermined frequency and switching off the switch when switching current or inductor current reaches a set value.

Referring to FIGS. 4 and 5, a current mode control type DC-DC converter 100 may include an L-C (inductor-capacitor) filter including a diode D, an inductor L and a capacitor C, a load resistor R and a switch device SW.

The output voltage of the DC-DC converter 100 is fed back to the control unit 200 according to the current mode control scheme, so that the control unit 200 may generate a PWM (Pulse Width Modulation) signal for controlling the switch device SW of the DC-DC converter 100.

The control unit 200 may include an error amplifier 210, a comparator 220 and an RS latch.

When the operation is examined, the RS latch is set by a constant-frequency clock. When the switch is turned on through the set, the switch current isw starts to increase. Meanwhile, the comparator 220 compares a peak value of the switch current isw with an output is of the error amplifier 210. Thus, when the switch current isw reaches to a set value, the RS latch is reset so that the Q is blocked. Thus, the duty ratio D is determined and the above-described operation is repeated, so that a constant output voltage Vo having a desired level may be obtained. The switch current isw may be one of the currents flowing through the switch device SW, the inductor L, the diode D and the output resistor R.

Meanwhile, in the current mode control scheme, when the duty ratio is equal to or more than 50%, a slope compensation may be additionally performed to prevent harmonics from occurring.

<Scheme of Driving Plural DC-DC Converters Including Phase Modulation Unit>

Figure 6:
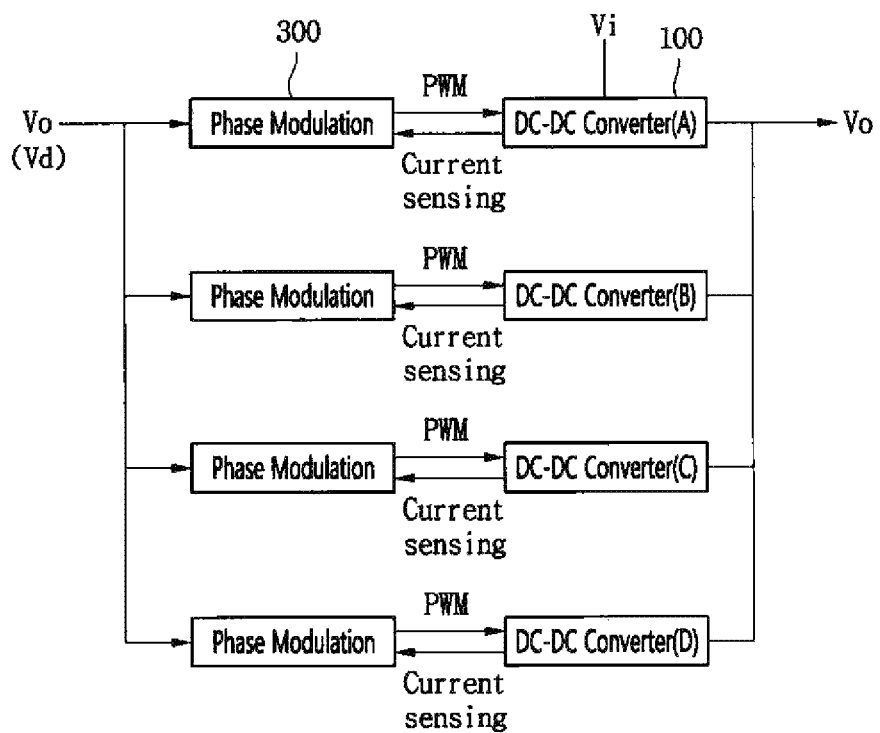
FIG. 6 is a block diagram illustrating a scheme of driving a plurality of DC-DC converters each including a phase modulation unit.
Figure 7:
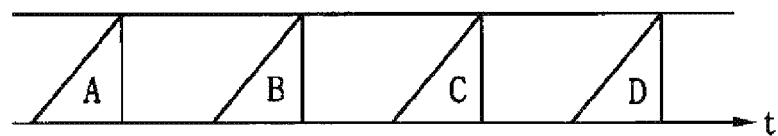
FIG. 7 is a waveform diagram illustrating sensing currents sensed by each block of FIG. 6.

FIG. 6 is a block diagram illustrating a scheme of driving a plurality of DC-DC converters each including a phase modulation unit, and FIG. 7 is a waveform diagram illustrating sensing currents sensed by each block (each of the plurality of DC-DC converters) of FIG. 6.

In the drawing, the blocks A, B, C and D may represent four DC-DC converters, respectively.

A method of driving the plurality of DC-DC converters 100 according to the above-described current mode control scheme will be described with reference to FIG. 6.

A single output voltage Vo of the DC-DC converters 100 may be applied to the phase modulation units 300. The output voltage Vo, which is the output voltage Vo of the DC-DC converter 100, may be a divided voltage Vd by the voltage divider of the control unit 200.

The phase modulation units 300 may output the output having a phase difference of 90 degrees through a phase shift.

The sensing current of the DC-DC converters 100 may be individually sensed in the unit of blocks A, B, C and D and the sensing current may be phase-shifted in the unit of the blocks A, B, C and D to reduce ripples. Thus, when the outputs having mutually different phases are superimposed on each other to be complementary to each other, the ripple may be reduced as compared with a single DC-DC converter, so that the electromagnetic wave property may be improved.

Meanwhile, four DC-DC converters 100 and corresponding four phase modulation units 300 are depicted in the drawings, but the embodiment is not limited thereto and may include three phase modulation units 100 and three phase modulation units 300. In this case, the phase modulation units 300 may have the functions of performing phase shifts of 0, 120 and 240 degrees, respectively.

<Current Mode Control Type DC-DC Converter Using Triangular Wave>

Figure 8:
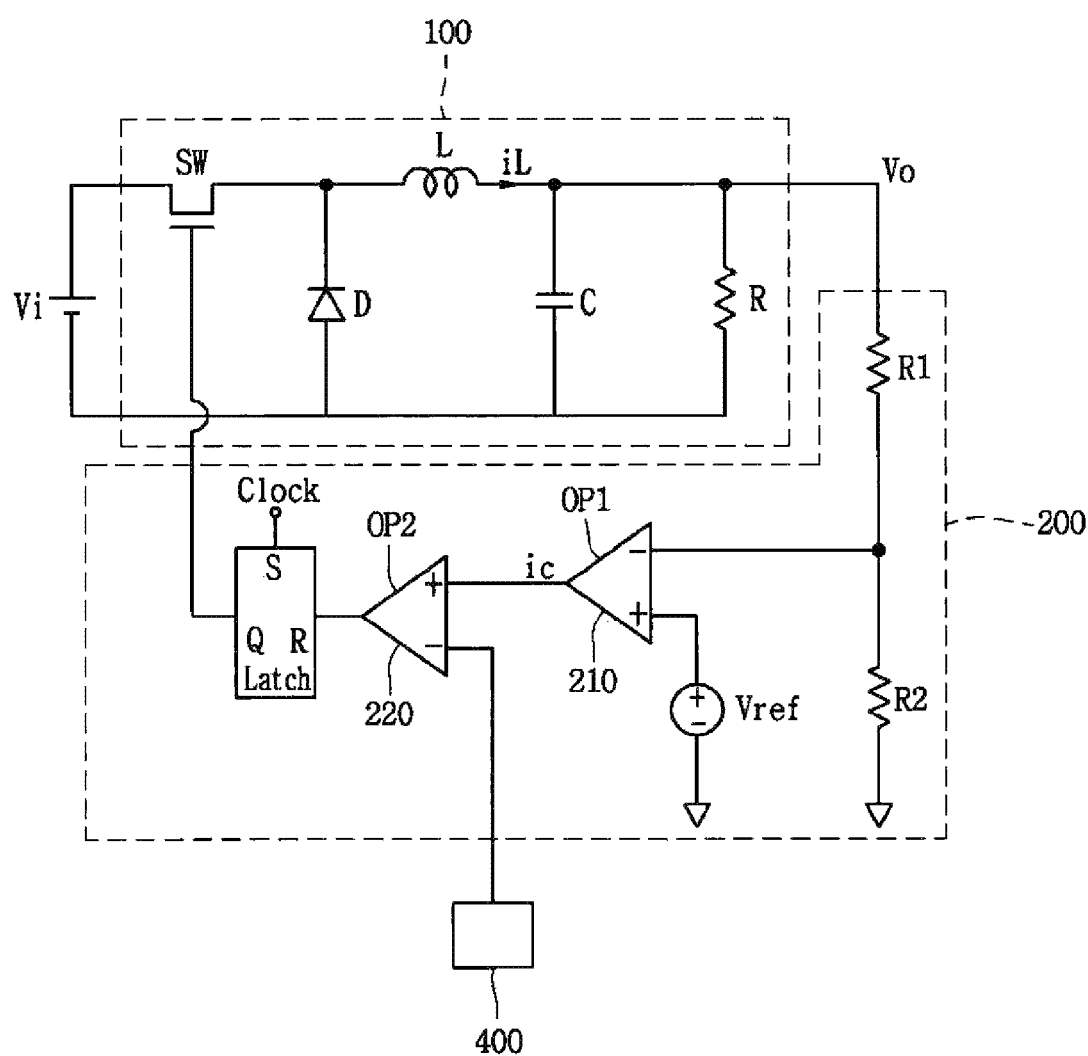
FIG. 8 is a circuit diagram showing a DC-DC converter and a control unit for controlling the same according to the first embodiment.

FIG. 8 is a circuit diagram showing a DC-DC converter and a control unit for controlling the same according to the first embodiment.

A method of controlling a current mode control type DC-DC converter 100 by using a triangular wave according to the first embodiment with reference to FIG. 8.

The DC-DC converter 100 according to the first embodiment may include a plurality of DC-DC converters 100 driven in parallel in order to obtain a high power, and one of the DC-DC converters 100 is depicted in FIG. 8.

The first embodiment may include a DC-DC converter 100, a control unit 200 and a triangular wave generating unit 400.

The control unit 200 may include an error amplifier 210, a comparator 220 and an RS latch.

Examining the operations, the RS latch is set by a constant-frequency clock. A pulse signal may be generated in synchronization with the set.

The comparator 220 compares a peak value of the triangular wave with an output ic of the error amplifier 210. Thus, when the triangular wave reaches to a set value ic, the RS latch is reset so that the Q is blocked. Thus, the duty ratio D is determined and the above-described operation is repeated, so that a constant output voltage Vo having a desired level may be obtained.

The first embodiment is a scheme of using a sensing signal and the triangular wave which is equivalent to the sensing current and artificially applied from the external triangular wave generating unit 400. That is, the first embodiment is a scheme of using a triangular wave in the current mode control scheme.

The scheme of using a triangular wave according to such new concept may have the following effects.

In the current mode control scheme, the voltage of 1V is required to sense a current and if the current is sensed on the inflowing path of 62.5 A, a sensing resistor of 16 mohm is required according to Ohm's law. In this case, the power lost at the sensing resistor is expressed as $P=I_{sensing} \times V_{sensing}=62.5$ [W]. Thus, the very great power is consumed by the sensing resistor. However, according to the first embodiment, since the DC-DC converter 100 is controlled by using the equivalent triangular wave without sensing a current, the power loss may be reduced.

Triangular Wave Generating Unit According to the First Embodiment

Figure 9:
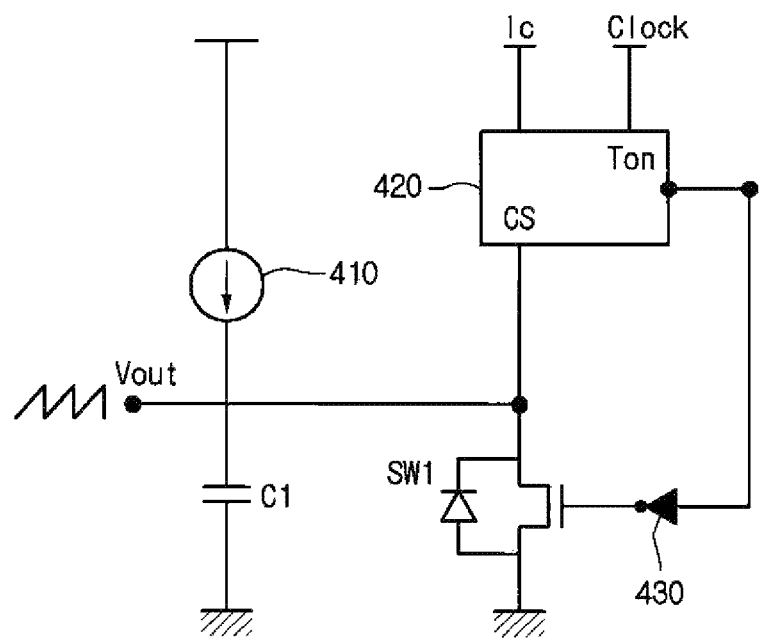
FIG. 9 is a circuit diagram showing a triangular wave generating unit according to the first embodiment.
Figure 10:
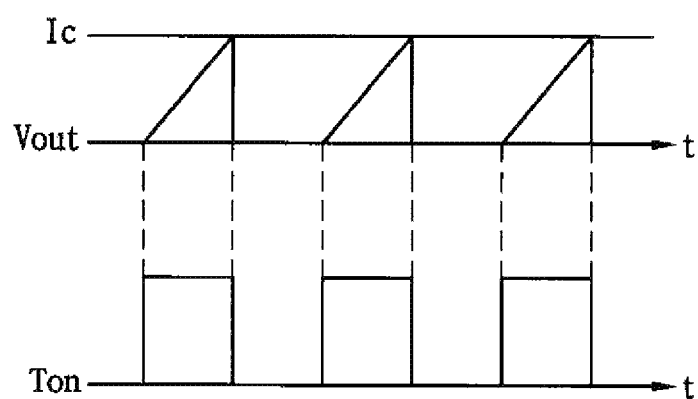
FIG. 10 is a waveform diagram showing a driving waveform of the triangular wave generating unit according to the first embodiment.

FIG. 9 is a circuit diagram showing a triangular wave generating unit according to the first embodiment, and FIG. 10 is a waveform diagram showing a driving waveform of the triangular wave generating unit according to the first embodiment.

The triangular wave generating unit will be described with reference to FIGS. 9 and 10.

The triangular wave generating unit 400 may include a constant current source 410, a triangular wave control unit 420 for outputting a pulse signal, an inverter 430 for inverting the pulse signal to output the inverted pulse signal, a first capacitor C1 charged with a current of the constant current source 410, and a first switch device SW1 controlled according to the pulse signal to control the charging or discharging of the first capacitor C1.

When the voltage between both terminals of the first capacitor C1 reaches to a level of a control signal output from the error amplifier 210, the level of the pulse signal is transited from a high level to a low level. Thus, the first switch device SW1 is turned on by the pulse signal having a low level, so that the first capacitor C1 may be discharged.

Examining the operation relationship in detail, when a constant current (icapacitor) flows into the first capacitor C1, the voltage between both terminals of the first capacitor C1 may be increased at a constant gradient. In detail, the relationship between voltage and current for a capacitor is expressed as $$i_{capacitor} = C_1 \frac{dv_{out}}{dt}.$$

Thus, the voltage both terminals of the capacitor is expressed as $$v_{out} = \frac{1}{C_1} \int i_{capacitor} dt.$$

If the current icapacitor of the constant current source 410 has a constant value K, the voltage at both terminals of the capacitor may be expressed as $v_{out}=Kt$[V], so that the triangular wave may be obtained.

The triangular wave control unit 420 reads out the charged voltage between both terminals of the capacitor from the CS terminal and compares the charged voltage Vout with the level of a control signal based on the control current Ic output from the error amplifier 210, such that the triangular wave control unit 420 outputs a signal Ton of a high level until the peak value of the charged voltage Vout reaches to the control current Ic. The first switch may be maintained in an off state by the inverter 430 which outputs an inverted signal of the signal Ton of the high level. In addition, when the peak value of the charged voltage Vout reaches to the control current Ic, the signal Ton having a low level is output so that the invert 430 outputs the inverted signal having a high level to turn on the first switch device SW1, so that the first capacitor C1 may be discharged. In addition, the triangular wave generating unit 420 may read out a clock signal in order to synchronize the set of the RS latch of the control unit 200.

While the above-described operation is repeated, the triangular wave generating unit 400 may generate the triangular wave.

A duty ratio (time period ratio), which is a ratio between the on time and off time of the switch SW included in the DC-DC converter 100, may be varied by the triangular wave. When the duty ratio is varied, the degree of controlling a level of the input power Vi of the DC-DC converter 100 may be varied.

Meanwhile, when the DC-DC converter 100 includes a plurality of DC-DC converters connected in parallel to each other, the control unit 200 may include a plurality of control units 200 for controlling the DC-DC converters 100, respectively.

In addition, the DC-DC converter 100 may be called a converter, or the converter and the control unit 200 may constitute the DC-DC converter 100.

<Constant Current Source of Triangular Wave Generating Unit>

Figure 11:
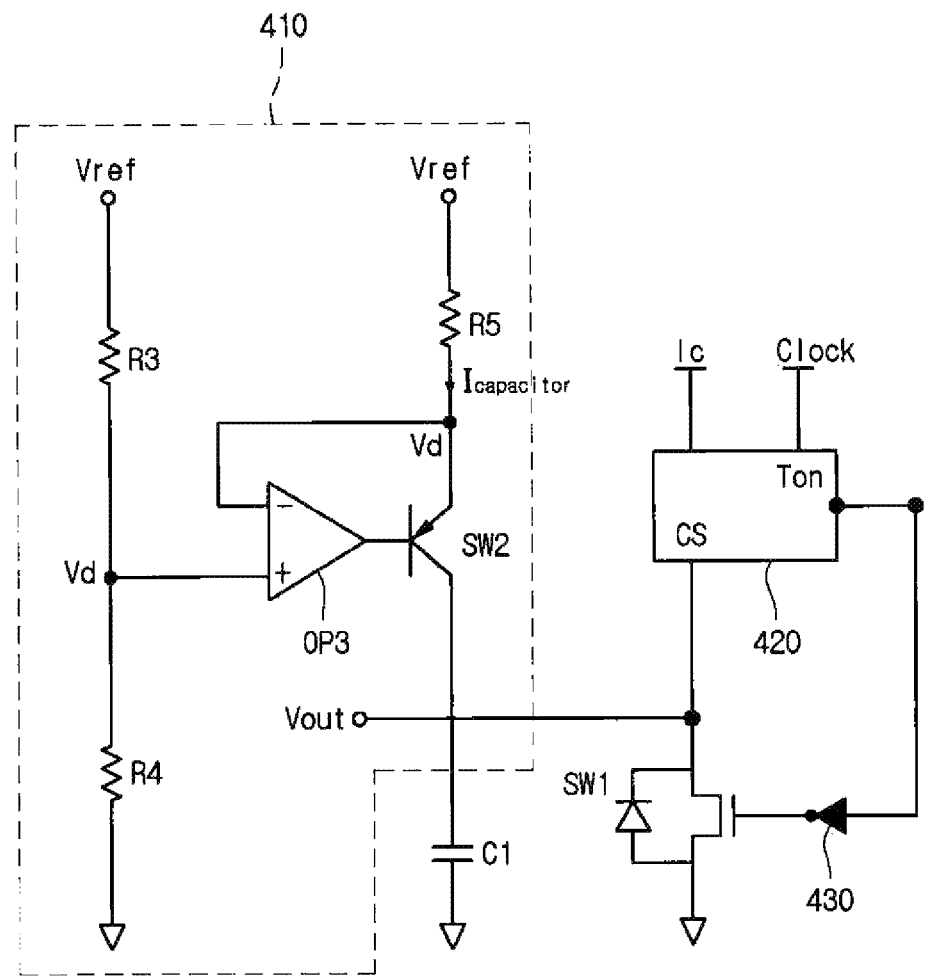
FIG. 11 is a circuit diagram showing a constant current source constituting a triangular wave generating unit according to the first embodiment.

FIG. 11 is a circuit diagram showing a constant current source constituting a triangular wave generating unit according to the first embodiment.

Referring to FIG. 11, the constant current source 410 of the triangular wave generating unit 400 is illustrated in detail.

In the constant current source 410, a reference voltage Vref is divided by resistors R3 and R4 and the divided voltage is input to the non-inverting terminal (+) of a third operational amplifier OP3. A second switch SW2 is turned on by a voltage difference between the reference voltage Vref and a divided voltage Vd (which is different from the divided voltage Vd of FIG. 4) of both terminals of a resistor R5 while the divided voltage Vd is input to the inverting terminal (−) of the third operational amplifier OP3. And, as the second switch SW2 is turned on, the first capacitor C1 may be charged with a constant current Icapacitor.

As the first capacitor C1 is charged, the voltage Vout is increased. The triangular wave control unit 420 reads out the increasing voltage Vout and outputs the signal Ton having a low level when the voltage Vout reaches to the value of the control current Ic. Thus, the first switch SW1 is turned on so that the first capacitor C1 is discharged. While the above-described operation is repeated, the triangular wave may be output to the terminal Vout.

FIGS. 12 to 15 are views illustrating driving a waveform when the embodiment is controlled in a current discontinuous mode.

When the first embodiment is operated in the current discontinuous mode, the effect may be maximized.

Figure 12:
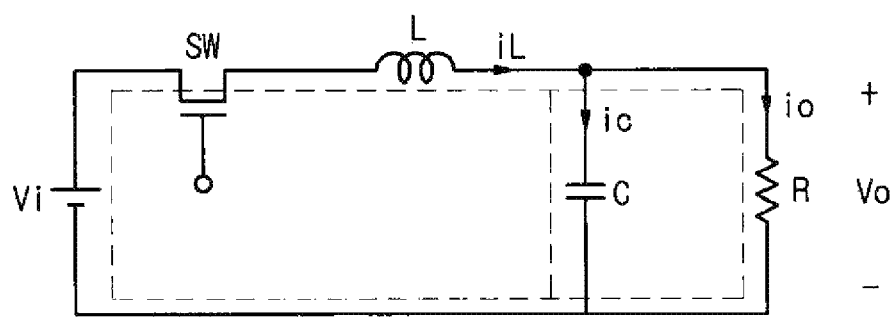
FIGS. 12 to 14 are views illustrating a driving waveform when the embodiment is controlled in a current discontinuous mode.
Figure 13:
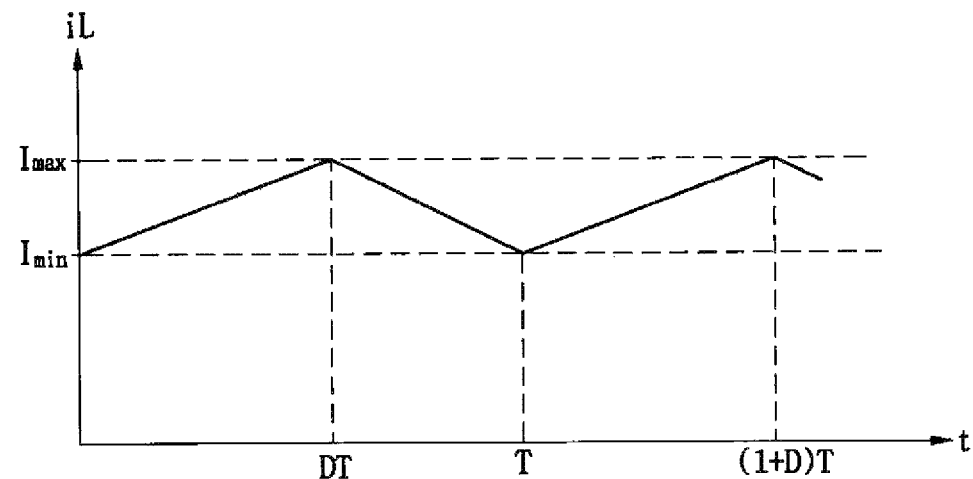
Figure 13:
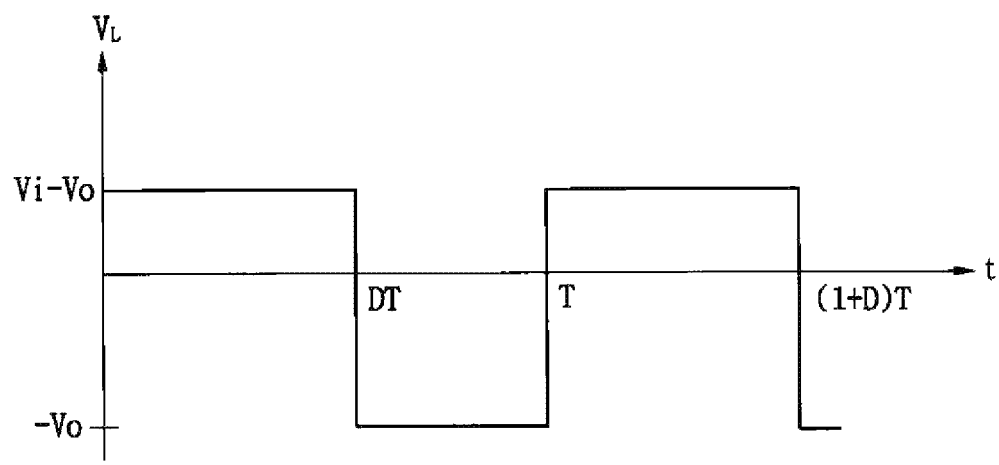
Figure 14:
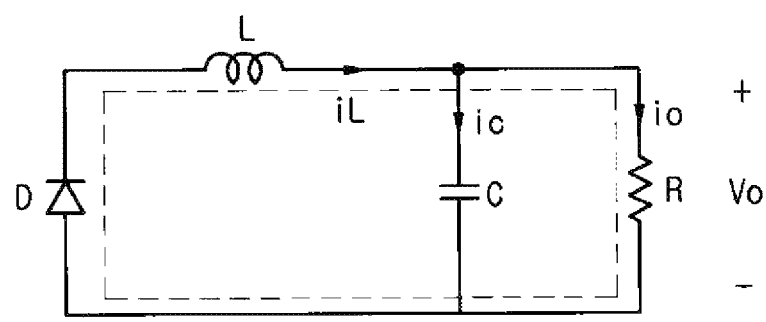

Referring to FIGS. 12 to 14, in the DC-DC converter 100, a time period that the current flowing through the inductor L becomes 0 (zero) may occur according to the load resistor R or the inductance of the inductor L. During the time period, the switch device SW and the diode D all may be turned off. The operation mode, in which there may exist a state that the inductor current is 0 (zero), is called a current discontinuous mode.

Hereinafter, the condition for allowing the current of the inductor current to be operated in the discontinuous mode will be described.

Before describing the condition for an operation in the discontinuous mode, a steady state for the inductor current iL and the output voltage Vo will be analyzed.

<Steady State Analysis>

<Steady State Analysis-Current Increasing Section $0 \leq t < DT$>

When the switch device SW is switched at a period T and a duty ratio D, the current iL and voltage vL of the inductor L are depicted in FIG. 13.

During a section DT for a switching period T, when KVL (Kirchhoff's Voltage Law) is applied to the DC-DC converter 100, the inductor voltage vL may be obtained through the following equation 1:

$$v_L = V_i - v_o \tag{1}$$

In addition, the relationship between the current iL and the voltage vL of the inductor L may be expressed as the following equation 2:

$$v_L = L \frac{di_L}{dt} \tag{2}$$

From the equations 1 and 2, the gradient of the current flowing through the inductor may be expressed as the following equation 3:

$$\frac{di_L}{dt} = \frac{V_i - v_o}{L} \tag{3}$$

However, in the steady state, since the output voltage vo is less than the input voltage vi, during the section DT for which the switch device SW is connected to the input power source, the inductor current iL is increased at the gradient of the equation 3. As shown in FIG. 13, the inductor current is the minimum current Imin at the moment that the switch device SW is connected to the power source (t=0). After the time DT is elapsed from the time at which the switch device SW is connected to the power source (t=DT), the inductor current is increased to the maximum current Imax. Thus, the equation 3 may be expressed as the following equation 4:

$$i_L(t) = \frac{1}{L} \int_0^T (V_i - v_o) dt + I_{min} \tag{4}$$

From the equation 4, the maximum current Imax of the inductor may be expressed as the following equation 5:

$$i_L(DT) = I_{max} = \frac{1}{L} \int_0^{DT} (V_i - v_o) dt + I_{min} \tag{5}$$

Here, when a ripple component of the output voltage vo is mostly removed by the L-C filter of the inductor L and the capacitor C, the output voltage vo may be a constant DC voltage. In this case, if the integral expression of equation 5 is analyzed, the current iL of the inductor L is increased during the DT section as the following equation 6:

$$I_{max} - I_{min} = \frac{V_i - V_o}{L} \times DT \tag{6}$$

<Steady State Analysis-Current Decreasing Section DT≤t<T>

While the switch SW is turned off during the (1-D)T section, the DC-DC converter 100 is operated as shown in FIG. 14.

When KVL (Kirchhoff's Voltage Law) is applied to the circuit, the inductor voltage vL may be obtained through the following equation 7:

$$v_L = -v_o \tag{7}$$

Since the relationship between the inductor current iL and the inductor voltage vL is equal to the equation 2, the gradient of the inductor current iL is expressed as the following equation 8:

$$\frac{di_L}{dt} = -\frac{v_o}{L} \tag{8}$$

However, in the steady state, the output voltage vo is greater than 0 (zero). During the section (1-D)T from the moment when the switch device SW is turned off, the inductor current iL is decreased at the gradient like the graph depicted in FIG. 13. That is, the inductor current iL is increased to the maximum current Imax at the moment (t=DT) when the switch device SW is turned off. After the time of (1-D)T is elapsed, the inductor current iL is decreased to the minimum current Imin at t=T. From the equation 8, the inductor current iL is expressed as the following equation 9:

$$i_L(t) = \frac{1}{L} \int_{DT}^{t} (-v_o) dt + I_{max} \tag{9}$$

The minimum value Imin of the inductor current is expressed as the following equation 10:

$$i_L(t=T) = I_{min} = \frac{1}{L} \int_{DT}^{T} (-v_o) dt + I_{max} \tag{10}$$

Here, it is assumed that the AC components are mostly removed by the L-C filter, the output voltage vo becomes a constant DC voltage. In this case, if the integral expression of equation 10 is analyzed, the inductor current iL is varied during the DT section as the following equation 11:

$$I_{min} - I_{max} = -\frac{V_o}{L} \times (1-D)T \tag{11}$$

<Steady State Analysis-Output Voltage Vo>

As shown in FIG. 13, the inductor current iL is increased during the DT section and decreased during the (1-D)T section. In the steady state, since the current increasing amplitude is equal to the current decreasing amplitude, from the equations 6 and 11, the average value Vo of the output voltages may be expressed as the following equation 12.

$$\frac{V_i - V_o}{L} \times DT = -\frac{V_o}{L} \times (1-D)T \tag{12}$$

The equation 12 may be expressed as following equation 13:

$$V_o = DV_i \tag{13}$$

<Output Voltage iL>

According to the switching operation of the switch device SW of the DC-DC converter 100, the inductor current iL may be obtained by analyzing the equations 5 and 9. However, since the increase and decrease of the inductor current iL is linearly varied as shown in FIG. 13, the average value IL of the currents flowing throughout the inductor L is obtained from the following equation 14:

$$I_L = \frac{I_{max} + I_{min}}{2} \tag{14}$$

In FIG. 14, when KCL is applied, the following equation 15 may be obtained:

$$i_L = i_C + i_o \tag{15}$$

However, when the average value of the capacitor current is Ic in the steady state, since the average value Ic is 0 (zero), the average value IL of the inductor current is equal to Io which is an average value of the inductor current iL. That is, this is expressed as the following equation 16:

$$I_L = I_o = \frac{V_o}{R} \tag{16}$$

Thus, from the equations 12, 14 and 16, the minimum value Imin and the maximum value Imax of the inductor current iL may be obtained as the following equations 17 and 18:

$$I_{max} = I_L + V_o \times \frac{1-D}{2L} \times T = I_o + V_i \times \frac{D(1-D)}{2L} \times T \tag{17}$$

$$I_{min} = I_L - V_o \times \frac{1-D}{2L} \times T = I_o - V_i \times \frac{D(1-D)}{2L} \times T \tag{18}$$

<Current Discontinuous Mode>

Figure 15:
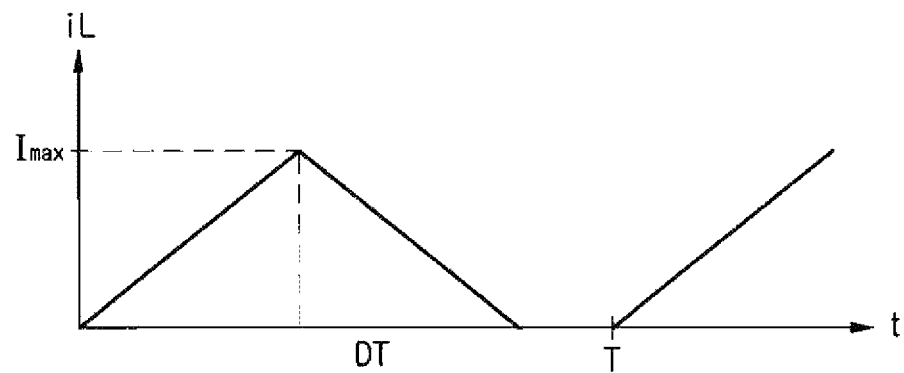
FIG. 15 is a waveform diagram showing a waveform of the inductor current iL in a current discontinuous mode.

FIG. 15 is a waveform diagram showing a waveform of the inductor current iL in a current discontinuous mode.

The condition for allowing the DC-DC converter 100 to be operated in the current discontinuous mode as shown in FIG. 15 is that the minimum value Imin of the inductor current is less than 0 (zero). Thus, the condition that the minimum value Imin expressed as the equation 18 is less than 0 is expressed as the following equation 19:

$$I_{min} = I_L - V_o \times \frac{1-D}{2L} \times T = I_o - V_i \times \frac{D(1-D)}{2L} \times T < 0 \tag{19}$$

That is, under the condition of the equation 19, the first embodiment may be operated in the current discontinuous mode.

For example, the DC-DC converter 100 may be operated in the current discontinuous mode when the input power of the DC-DC converter 100 is 100V, the switch device SW is controlled at a switching frequency of 100 kHz, the capacitance of the capacitor C is sufficiently great such that the output voltage vo is constant, the inductance of the inductor L is 50 uH, the duty ratio is 0.5, and the output current Io is less than 2.5 A from the equation 19.

The conditions for the operation of the current discontinuous mode have been described above. Hereinafter, problems caused when the first embodiment is operated in the current continuous mode will be described.

Figure 16:
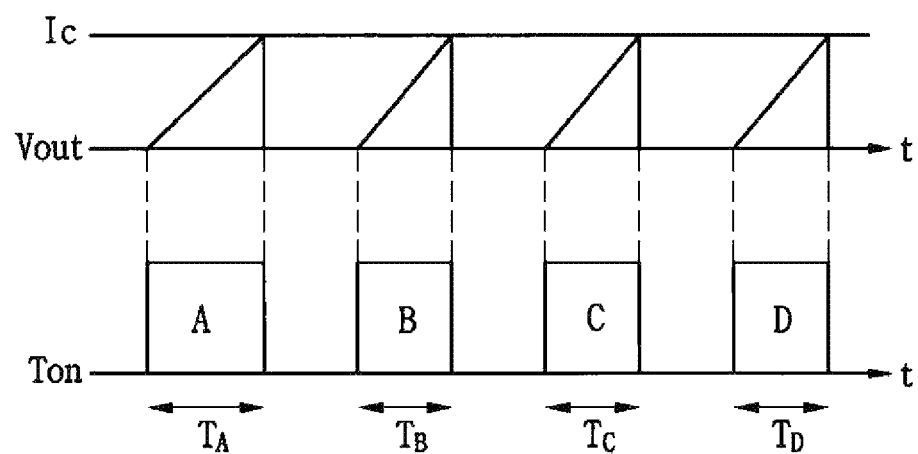
FIGS. 16 and 17 are views illustrating problems caused in the current continuous mode.
Figure 17:
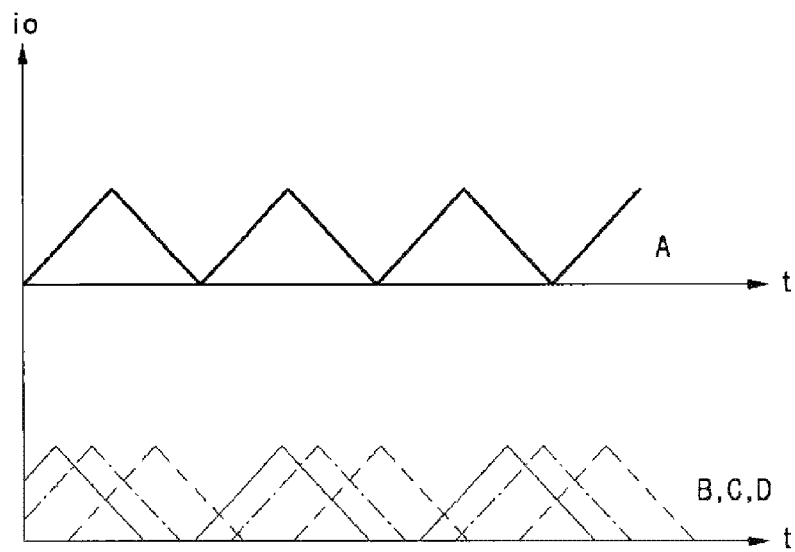

FIGS. 16 and 17 views illustrating problems caused in the current continuous mode.

Referring to FIGS. 16 and 17, due to deviations between the devices of each DC-DC converter 100 of the blocks A, B, C and D, the turn-on and -off times of the first switch SW1 of the triangular wave control unit 420 of the triangular wave generating unit 400 may be varied. In this case, the gradient of the triangular wave may be varied, that is, TA>TB=TC=TD in the drawing. Thus, a phenomenon of concentrating current into the block A having the most gradient of the triangular wave may occur. Thus, although the block A enters the current continuous mode as the output current of the block A is increased, the currents of the remaining blocks B, C and D are in the current discontinuous mode. Therefore, when the first embodiment is used not in the current discontinuous mode but in the current continuous mode, each block may be operated in a mixed mode of the current continuous and discontinuous modes. Thus, when the DC-DC converter is maintained in the current discontinuous mode according to the condition of the equation 19, the current may be prevented from being concentrated into one of the blocks and all blocks may be maintained in the current discontinuous mode. Therefore, a desired output may be obtained and in addition, any sensing resistors for sensing current are not required, so that the power loss may be reduced.

Meanwhile, the first embodiment is applicable to an energy charge system and specifically, usable for an LED control power supply.

Among a main converter and supplementary converters constituting the LED control power supply, the embodiment may be applied to the supplementary converters operated in the current discontinuous mode.

In addition, since power conditioning is important in equipment connected to an electrical distribution network and a PFC (Power Factor Correction) circuit may be controlled in the current discontinuous mode, the embodiment may be applied to the PFC circuit.

<Current Balance Control Unit of DC-DC Converter>

Figure 18:
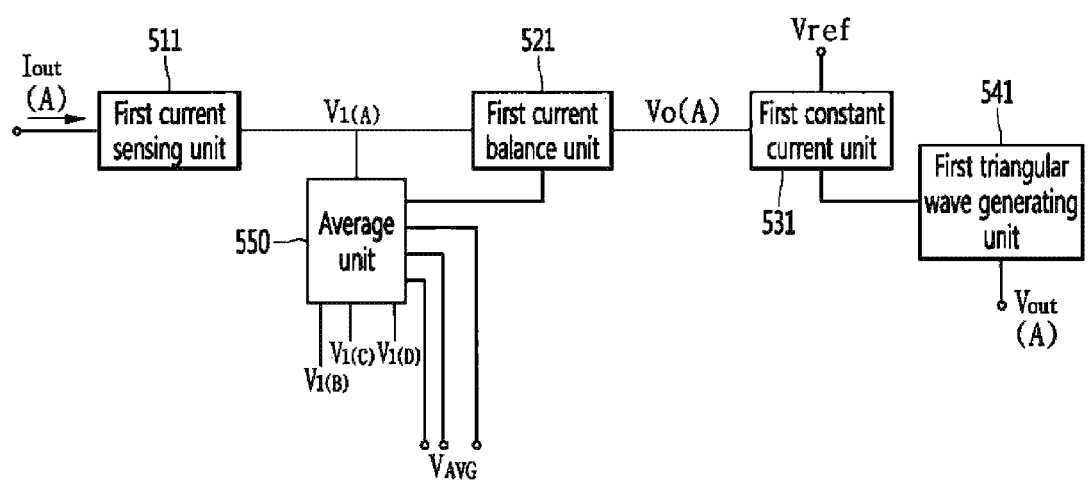
FIG. 18 is a block diagram showing a current balance control unit of a DC-DC converter according to the second embodiment.

FIG. 18 is a block diagram showing a current balance control unit of a DC-DC converter according to the second embodiment.

Referring to FIG. 18, the current balance control unit 500 constituting the control unit 200 for controlling the DC-DC converter 100 may include a first current sensing unit 511, a first current balance unit 521, a first constant current unit 531, a first triangular wave generating unit 541 and an average unit 550.

The first current sensing unit 511 may sense an output current of the DC-DC converter 100 to output an amplified voltage V1(A) based on the sensed output current.

The average unit 550 may average the voltage V1(A) output from the first current sensing unit 511 and the voltages output from each of the DC-DC converters connected in parallel to each other to output the average value.

The first current balance 521 may amplify the difference signal between the output voltage V1(A) output from the first current sensing unit 511 and the average voltage VAVG to output a second output voltage Vo(A).

The first constant current unit 531 may output a constant current based on the second output voltage Vo(A) output from the first current balance unit 521 and a reference voltage Vref.

The first triangular wave generating unit 541 may output a triangular wave Vout(A) having a gradient based on the current value output from the first constant current unit 531.

Figure 19:
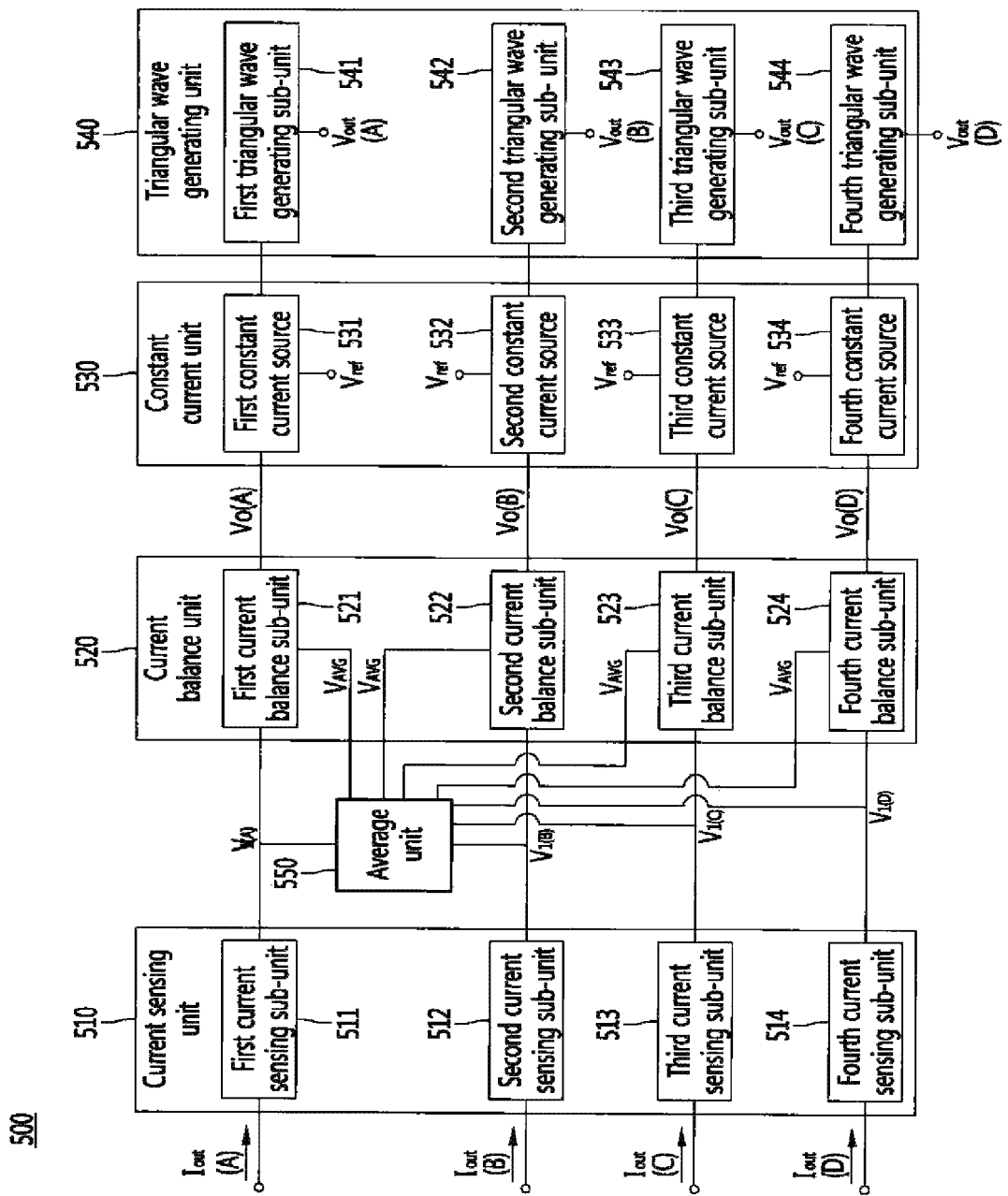
FIG. 19 is a block diagram showing a current balance control unit in case that the DC-DC converter is driven in parallel according to the second embodiment.

FIG. 19 is a block diagram showing a current balance control unit in case that the DC-DC converter is driven in parallel according to the second embodiment.

According to the second embodiment, each of the n DC-DC converters 100, which are connected in parallel to each other, include a switch device. A level of the input voltage Vi applied to the DC-DC converter 100 is controlled according to the duty ratio of a first pulse signal applied to the switch device and is output as the output voltage Vo.

Each of the n control units 200 may detect the currents from the n DC-DC converters 100 and compare an average value of the detected currents with one of the detected currents in order to control the duty ratio of the first pulse signal.

The current balance control unit 500 may include a current sensing unit 510 for detecting and amplifying the n sensing currents Iout(A)~Iout(n) to output n first output voltages, an average unit 550 for averaging the n first output voltages V1(A)~V1(n) to output the average voltage VAVG, a current balance unit 520 for comparing the average voltage VAVG with the n first output voltages V1(A)~V1(n) to output n second output voltages Vo(A)~Vo(n), and a triangular wave generating unit 540 for generating n triangular waves Vout(A)~Vout (n) having gradients adjusted according to the n second output voltages Vo(A)~Vo(n), respectively.

The current sensing unit 510 may include first to n-th current sensing sub-units 511 to 514. The first to n-th current sensing sub-units 511 to 514 may detect the n sensing currents Iout(A)~Iout(n) to output the n first output voltages V1(A)~V1(n), respectively. That is, the first current sensing sub-unit 511 may detect the first sensing current Iout(A) to output the (1-1)-th output voltage V1(A), and the n-th current sensing sub-unit may detect the n-th sensing current Iout(n) to output the (1-n)-th output voltage V1(n).

The current valance unit 520 may include first to n-th current balance sub-units 521 to 524. The first to n-th current balance sub-units 521 to 524 may compare the average voltage VAVG with the n first output voltages V1(A)~V1(n) to output the n second output voltages Vo(A)~Vo(n), respectively. That is, the first current balance sub-unit 521 may compare the average voltage VAVG with the (1-1)-th output voltage V1(A) to output the (2-1)-th output voltage Vo(A), and the n-th current balance sub-unit 524 may compare the average voltage VAVG with the (1-n)-th output voltage V1(n) to output the (2-n)-th output voltage Vo(n).

The triangular wave generating unit 540 may include first to n-th triangular wave generating sub-units 541 to 544. The first to n-th triangular wave generating sub-units 541 to 544 may output the n triangular waves Vout(A)~Vout(n) having gradients determined based on levels of the n second output voltages Vo(A)~Vo(n), respectively. That is, the first triangular wave generating sub-unit 541 may output the first triangular wave Vout(A) having the gradient determined based on the level of the (2-1)-th output voltage Vo(A), and the n-th triangular wave generating sub-unit may output the n-th triangular wave Vout(n) having the gradient determined based on the level of the (2-n)-th output voltage Vo(n).

The control unit 200 may include an error amplifier 210 for comparing the n output voltages of the n DC-DC converters 100 with the reference voltage Vref and for amplifying errors of the n output voltages to output the n control signals Ic, respectively, and a comparator 220 for comparing the n control signals Ic (Icontrol) with the n triangular waves Vout(A)~Vout(n) to control the switch devices SW included in the n DC-DC converters 100, respectively.

The control unit 200 may further include n constant current sources 531 to 534 for providing currents according to each of the n second output voltages Vo(A)~Vo(n).

The triangular wave generating unit 540 may include n capacitors C charged with n constant currents Ic (Icapacitor) output from the n constant current sources 531 to 534, respectively, n second switch devices SW2 for controlling the charges or discharges of the n capacitors C, and a triangular wave control unit 420 for controlling the turn-on or -off operations of the n second switch devices SW2.

The triangular wave control unit 420 may control the n second switch devices SW2 based on the charged voltages of the n capacitors C and the n control signals Ic (Icontrol), respectively. In addition, the triangular wave is a voltage between both terminals of the capacitor C.

In this case, the DC-DC converter 100 may be a buck type.

The above-described operations will be examined in detail with reference to FIG. 19. When the plurality of DC-DC converters 100 are connected in parallel to each other to be driven, the current balance control unit 500 may include a plurality of current sensing units 510, a plurality of current balance units 520, a plurality of constant current units 530 and a plurality of triangular wave generating units 540.

The four DC-DC converters 100 driven in parallel are depicted in the drawing, but the embodiment is not limited thereto. That is, the embodiment may provide more than or less than four DC-DC converters 100 driven in parallel.

When the four DC-DC converter 100 are driven in parallel, the current sensing unit 510 of the current balance control unit 500 may include the first to fourth current sensing sub-units 511 to 514. In addition, the current balance unit 520 may include the first to fourth current balance sub-units 521 to 524 and the constant current unit 530 may include the first to fourth constant current sources 531 to 534. Further, the triangular wave generating unit 540 may include the first to fourth triangular wave generating sub-units 541 to 544.

The four DC-DC converters 100 may represent the blocks A, B, C and D, respectively.

In addition, the current balance control unit 500 according to the second embodiment may further include the average unit 550 which receives the output signals output from the first to fourth current sensing sub-units 511 to 514 to output the average of the output signals.

The first to fourth current sensing sub-units 511 to 514 may detect the output currents Iout(A), Iout(B), Iout(C) and Iout(D) from the four DC-DC converters 100 connected in parallel to each other, respectively.

The output currents Iout(A), Iout(B), Iout(C) and Iout(D) are currents flowing through the inductors L, the diodes D or the output loads R constituting the DC-DC converters 100

The first to fourth current sensing sub-units 511 to 514 may sense the output currents Iout(A), Iout(B), Iout(C) and Iout(D) and amplify the sensed output currents to output the first output voltages V1(A), V1(B), V1(C) and V1(D), respectively.

The first to fourth current balance sub-unit 521 to 524 may receive the first output voltages V1(A), V1(B), V1(C) and V1(D), respectively. In addition, the average unit 550 may receive the first output voltages V1(A), V1(B), V1(C) and V1(D).

The average unit 550 may output the average voltage VAVG based on the first output voltages V1(A), V1(B), V1(C) and V1(D).

The first to fourth current balance sub-unit 521 to 524 may output differential second output voltages Vo(A), Vo(B), Vo(C) and Vo(D) based on the average voltage VAVG output from the average unit 550 and the first output voltages V1(A), V1(B), V1(C) and V1(D), respectively.

The first to fourth constant current sources 531 to 534 may output constant currents based on the differential second output voltages Vo(A), Vo(B), Vo(C) and Vo(D) and the reference voltage Vref, respectively.

The first to fourth triangular wave generating sub-units 541 to 544 may use the constant currents output from the first to fourth constant current source sub-units 531 to 534 to output the triangular waves Vout(A), Vout(B), Vout(C) and V(out(D) to the blocks A, B, C and D, that is, the four DC-DC converters 100, respectively.

In detail, the triangular waves Vout(A), Vout(B), Vout(C) and V(out(D) may be applied to the non-inverting terminal (+) of the comparator 220 in FIG. 8, respectively.

The turn-on and -off times of the switch devices SW included in the DC-DC converters 100, that is, the duty ratios may be varied with the gradients of the triangular waves Vout(A), Vout(B), Vout(C) and V(out(D) output from the first to fourth triangular wave generating sub-units 541 to 544.

The gradients of the triangular waves Vout(A), Vout(B), Vout(C) and V(out(D) may vary according to the levels of the second output voltages Vo obtained by differentially amplifying the first output voltages and the average voltage VAVG.

When the output current output from one of the blocks A, B, C and D is greater than the average value, the second output voltage is decreased so that the triangular wave is increased, thereby decreasing the turn-on time.

When the turn-on time is decreased, the output current of the corresponding block is decreased. The output currents of the blocks A, B, C and D may be balanced through the above-described scheme.

<Circuit Diagram of Current Balance Control Unit of DC-DC Converter>

Figure 20:
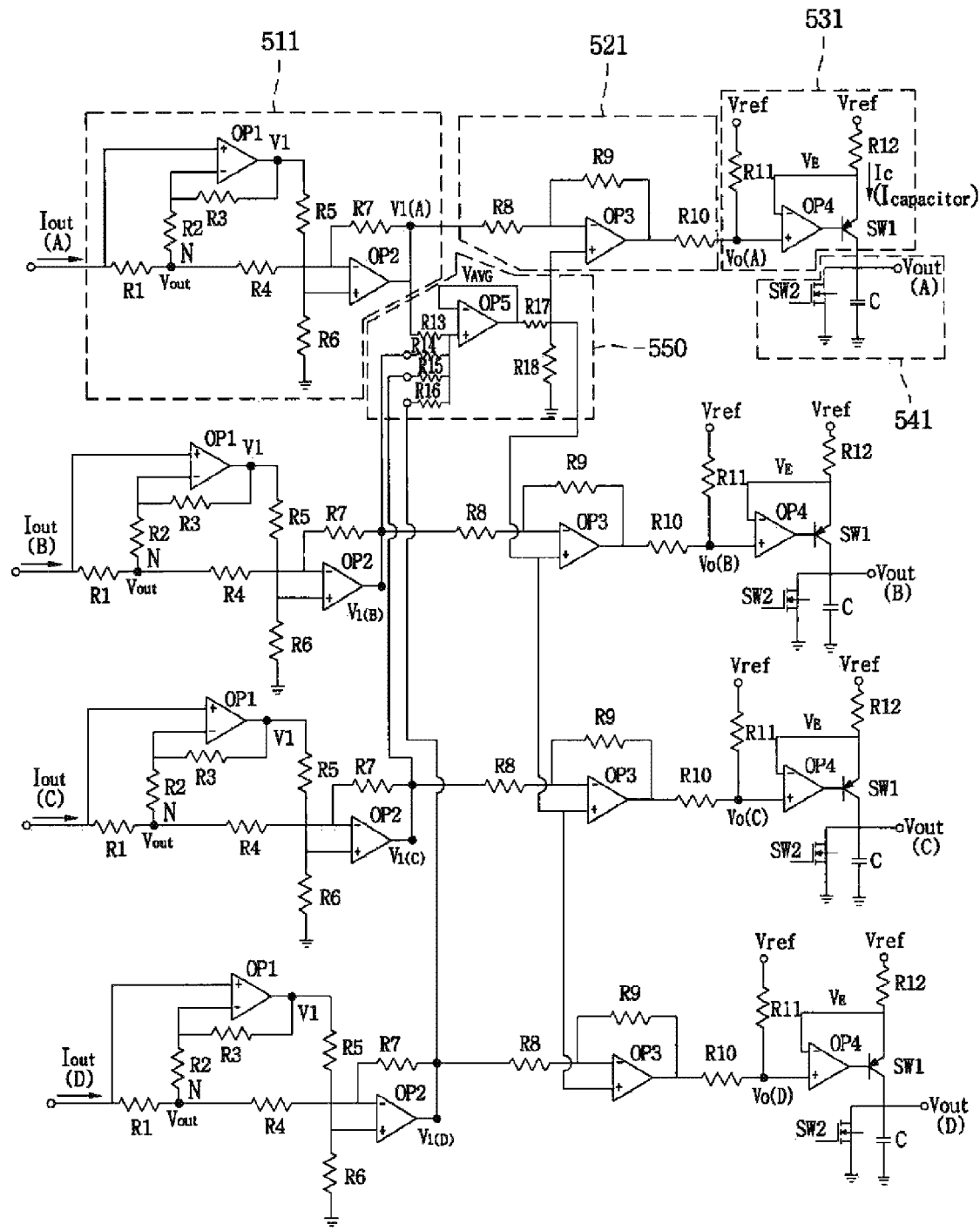
FIG. 20 is a circuit diagram showing a current balance control unit of the DC-DC converter according to the second embodiment.

FIG. 20 is a circuit diagram showing a current balance control unit of the DC-DC converter according to the second embodiment.

Referring to FIGS. 19 and 20, the current balance control unit 500 of the DC-DC converter 100 according to the second embodiment may include first to fifth amplifiers OP1 to OP5.

The n DC-DC converters 100, which are connected in parallel to each other, include switch devices, respectively (where n is an integer of 2 or more). The level of the input voltage applied to the DC-DC converter 100 is adjusted according to the duty ratio of the first pulse signal applied to the switch device SW and outputs, the output voltage.

In addition, the current sensing unit 510 of the DC-DC converter 100 may amplify the sensing voltages Vout to output the first output voltages V1, where the sensing voltages Vout are based on the output currents Iout of the DC-DC converters 100 flowing through the sensing resistors R1 for sensing the currents of the DC-DC converts 100. The current balance unit 520 may amplify the differential signal between the average voltage VAVG of the first output voltages V1 and the first output voltages V1 to output the second output voltages Vo. Further, the ratio of the first pulse signal may be controlled according to the levels of the second output voltages Vo.

Each of the current sensing units 510 may include the first amplifier OP1 for non-inverting amplifying the sensing voltage Vout and the second amplifier OP2 for amplifying the differential signal between the output of the first amplifier OP1 and the sensing voltage Vout.

Each of the current balance units 520 may include the third amplifier OP3 for amplifying the differential signal between the output voltage V1 of the second amplifier OP2 and the average voltage VAVG.

The configuration for controlling the DC-DC converter may further include the constant current source 430 for outputting a constant current based on the output voltage of the third amplifier OP3 and the triangular wave generating unit 540 for generating the triangular wave based on the current Ic (Icapacitor) output from the constant current source 430.

The triangular wave generating unit 540 may include a capacitor C charged with the current Ic (Icapacitor) output from the constant current source 530, a second switch device SW2 connected between the capacitor C and the ground to discharge the capacitor C, and a triangular wave control unit 420 for controlling the second switch device SW2.

The triangular may allow the second switch device SW2 to be turned on or off according to the charged voltage of the capacitor C.

As a configuration for control the DC-DC converter 100, an average unit 550 may be further provided to generate the average voltage VAVG. The average unit 550 may include a buffer OP5 for averaging the first output voltages V1.

Meanwhile, the gradient of the triangular wave may be controlled by comparing the level of one of the sensing voltages Vout with the level of the average voltage VAVG.

Hereinafter, the second embodiment will be described in detail with reference to FIG. 20.

Each of the first to fourth current sensing sub-units 511 to 514 may include the first and second amplifiers OP1 and OP2 and the first to seventh resistors R1 to R7. Each of the first to fourth current balance sub-units 521 to 524 may include the third amplifier OP3 and the eighth to tenth resistors R8 to R10. Each of the first to fourth constant current sources 531 to 534 may include the fourth amplifier OP4, the first switch SW1, and the eleventh and twelfth resistors R11 and R12. Each of the first to fourth triangular wave generating sub-units 541 to 544 may include the second switch SW2 and a capacitor C. And, the average unit 550 may include the fifth amplifier OP5 and the 13-th to 18-th resistors R14 to R18.

Hereinafter, the connections between the amplifiers OP1 to OP4, which may be configured with operational amplifiers, and the resistors will be described.

The first amplifier OP1 may include a non-inverting amplifier. The non-inverting terminal (+) of the first amplifier OP1 may be connected to a current sensing node of the block A, B, C or D. The first resistor R1 may be connected between the current sensing node and a node N. The second resistor R2 may be connected between the inverting terminal (−) of the first amplifier OP1 and the node N. And, the third resistor R3 may be connected between the output terminal of the first amplifier OP1 and the inverting terminal (−).

The fourth resistor R4 may be connected between the output terminal of the first amplifier OP1 and the inverting terminal (−). The fifth resistor R5 may be connected between the output terminal of the first amplifier OP1 and the non-inverting terminal of the second amplifier. The sixth resistor R6 may be connected between the non-inverting terminal (+) of the second amplifier OP2 and the ground. The seventh resistor R7 may be connected between the inverting terminal (−) of the second amplifier OP2 and the output terminal of the second amplifier OP2.

The eighth resistor R8 may be connected between the output terminal of the second amplifier OP2 and the inverting terminal (−) of the third amplifier OP3. The ninth resistor, which is a resistor for configuring a negative feedback of the third amplifier OP3, may be connected between the inverting terminal (−) of the third amplifier OP3 and the output terminal of the third amplifier OP3.

The tenth resistor R10 may be connected between the output terminal of the third amplifier OP3 and the non-inverting terminal (+) of the fourth amplifier OP4. The eleventh resistor R11 may be connected between the reference voltage supply terminal Vref and the non-inverting terminal (+) of the fourth amplifier OP4. The twelfth resistor R12 may be connected between the reference voltage supply terminal Vref and the inverting terminal (−) of the fourth amplifier OP4. The twelfth resistor R12 may be connected between the reference voltage supply terminal Vref and the emitter of the first switch SW1. The output terminal for the fourth amplifier OP4 may be connected to the base of the first switch SW1.

The capacitor C may be connected between the emitter of the first switch SW1 and the ground, and may be connected between the drain of the second switch SW2 and the ground.

The second switch SW2 may be turned on or off according to the control signal applied to the gate of the second switch SW2. The drain of the second switch SW2 may be connected to the emitter of the first switch SW1 and the source may be connected to the ground.

The first switch SW1 may include a bipolar junction transistor (BJT) and the second switch SW2 may include an MOSFET transistor, but the embodiment is not limited thereto and any devices may be used if the devices can perform a switching function.

The 13-th resistor R13 may be connected between the output terminal of the second amplifier OP2 of the first current sensing sub-unit 511 and the non-inverting terminal (+) of the fifth amplifier OP5. The 14-th resistor R14 may be connected between the output terminal of the second amplifier OP2 of the second current sensing sub-unit 512 and the non-inverting terminal (+) of the fifth amplifier OP5. The 15-th resistor R15 may be connected between the output terminal of the second amplifier OP2 of the third current sensing sub-unit 513 and the non-inverting terminal (+) of the fifth amplifier OP5. The 16-th resistor R16 may be connected between the output terminal of the second amplifier OP2 of the fourth current sensing sub-unit 514 and the non-inverting terminal (+) of the fifth amplifier OP5. The 17-th resistor R17 may be connected between the output terminal of the fifth amplifier OP5 and the non-inverting terminal (+) of the third amplifier OP3. The 18-th resistor R18 may be connected between the non-inverting terminal (+) of the third amplifier OP3 and the ground. The inverting terminal (−) and the output terminal of the fifth amplifier OP5 may be connected to each other so that the fifth amplifier OP5 may be operated as a buffer following the voltage of the non-inverting terminal (+) thereof.

<Operation Type of Current Balance Control Unit>

Hereinafter, the operation of the current balance control unit 500 according to the second embodiment will be described.

For the purpose of convenient description, the following description will be focused on the first current sensing sub-unit 511, the current balance sub-unit 521, the first constant current source 531, the first triangular wave generating sub-unit 541 and the average unit 550 corresponding to the block A. The same operation is applicable to the remaining blocks.

The output current (sensing current) Iout(A) of the block A applied to the first current sensing sub-unit 511 passes throughout the first resistor R1 to generate a voltage (sensing voltage) Vout at the node N. The voltage Vout of the node N may be expressed as the following equation 1:

$$V_{out} = R_1 \times I_{out(A)} \tag{1}$$

The first resistor R1 may become a sensing resistor. Thus, when the sensing current Iout(A) is detected, the sensing voltage Vout may be detected through the first resistor R1.

According the non-inverting amplification property of the first amplifier OP1, the output V1 of the first amplifier OP1 may be expressed as the following equation 2:

$$V_1 = \left(1 + \frac{R_3}{R_2}\right) V_{out} = \left(1 + \frac{R_3}{R_2}\right) I_{out(A)} \times R_1 \tag{2}$$

When KCL is applied to both input terminals of the second amplifier OP2 of the first current sensing sub-unit 511, the output V1(A) may be expressed as the following equation 3:

$$V_{1(A)} = \frac{(R_4 + R_7)R_8}{R_4(R_5 + R_6)} V_1 - \frac{R_7}{R_8} V_{out} \tag{3}$$

When the second amplifier OP2 is operated as a differential amplifier, the relationship between the resistors connected to the second amplifier OP2 may be expressed as the following equation 4:

$$\frac{R_7}{R_4} = \frac{R_6}{R_5} \tag{4}$$

From the equation 4, the equation 3 may be written as the following equation 5:

$$V_{1(A)} = \frac{R_7}{R_4}(V_1 - V_{out}) = \frac{R_7}{R_4}(V_1 - R_1 I_{out}) \tag{5}$$

According to the equation 5, when the sensing current Iout(A) is increased, the voltage value of the first output voltage V1(A) may be decreased.

When the voltage of the non-inverting terminal (+) of the average unit 500 is denoted as V+(OP5) and KCL is applied at the non-inverting terminal (+), the following equation 6 is obtained:

$$\frac{V_{+(OP5)} - V_{1(A)}}{R_{13}} + \frac{V_{+(OP5)} - V_{1(B)}}{R_{14}} + \frac{V_{+(OP5)} - V_{1(C)}}{R_{15}} + \frac{V_{+(OP5)} - V_{1(D)}}{R_{16}} = 0 \tag{6}$$

The equation 6 may be rewritten as the following equation 7:

$$\left(\frac{1}{R_{13}} + \frac{1}{R_{14}} + \frac{1}{R_{15}} + \frac{1}{R_{16}}\right) V_{+(OP5)} = \frac{V_{1(A)}}{R_{13}} + \frac{V_{1(B)}}{R_{14}} + \frac{V_{1(C)}}{R_{15}} + \frac{V_{1(D)}}{R_{16}} \tag{7}$$

In order to calculate the average of the output voltages V1(A), V1(B), V1(C) and V1(D) from the first to fourth current sensing sub-units 511 to 514 corresponding to the blocks A, B, C and D, the relationship between the resistors of the average unit 550 may be expressed as the following equation 8:

$$\frac{1}{R_{13}} + \frac{1}{R_{14}} + \frac{1}{R_{15}} + \frac{1}{R_{16}} \tag{8}$$

When the equation 8 is applied to the equation 7, the voltage V+(OP5) of the non-inverting terminal (+) of the fifth amplifier OP5 is expressed as the following equation 9:

$$V_{+(OP5)} = \frac{1}{4}(V_{1(A)} + V_{1(B)} + V_{1(C)} + V_{1(D)}) \tag{9}$$

According to the characteristics of an amplifier, the following equation 10 is obtained:

$$V_{AVG} = V_{-(OP5)} = V_{+(OP5)} \tag{10}$$

From the equation 10, the average voltage VAVG of the output voltages V1(A), V1(B), V1(C) and V1(D) from each of the first to fourth current sensing sub-units 511 to 514 corresponding to the blocks A, B, C and D may be calculated.

According to the differential amplification characteristics of the third amplifier OP3 of the first current balance unit 521, the output voltage of the third amplifier OP3 may be expressed as the following equation 11:

$$V_{o(OP3)} = \frac{(R_8 + R_8)R_{18}}{R_8(R_{17} + R_{18})} V_{AVG} - \frac{R_9}{R_8} V_{1(A)} \tag{11}$$

Taking into consideration the differential amplification characteristics of the third amplifier OP3, the relationship of the resistors connected to the third amplifier OP3 is expressed as the following equation 12:

$$\frac{R_9}{R_8} = \frac{R_{18}}{R_{17}} \tag{12}$$

When the equation 12 is applied to the equation 11, the output voltage of the third amplifier OP3 is expressed as the following equation 13:

$$V_{o(OP3)} = \frac{R_9}{R_8}(V_{AVG} - V_{1(A)}) \quad (13)$$

According to the equation 13, when the voltage of the first output voltage V1(A) is decreased, it is known that the voltage value of the output voltage Vo(OP3) of the third amplifier OP3 is decreased.

When KLC is applied to the node of the non-inverting terminal (+) of the fourth amplifier OP4 constituting the first constant current source 531, the following equation 14 is obtained:

$$\frac{V_{o(A)} - V_{o(CP3)}}{R_{10}} + \frac{V_{o(A)} - V_{ref}}{R_{11}} = 0 \quad (14)$$

When the equation 14 is rewritten, the second output voltage Vo(A) is expressed as the following equation 15:

$$V_{o(A)} = \frac{R_{10} \times R_{11}}{R_{10} + R_{11}}\left(\frac{1}{10}V_{o(OP3)} + \frac{1}{R_{11}}V_{ref}\right) \quad (15)$$

When the resistors of the first constant current source 531 satisfies the following equation 16, the second output voltage is expressed as the following equation 17:

$$R_{10} = R_{11} \quad (16)$$

$$V_{o(A)} = \frac{1}{2}(V_{o(OP3)} + V_{ref}) \quad (17)$$

According to the characteristics of the operational amplifier of the fourth amplifier OP4, the following equation is obtained:

$$V_B = V_{-(OP4)} = V_{+(OP4)} \quad (18)$$

Thus, when the first switch SW1 is turned on, the constant current may flow through the capacitor C of the triangular wave generating sub-unit 541. In this case, the constant current Ic is expressed as the following equation 19:

$$I_C = \frac{V_{ref} - V_B}{R_{12}} \quad (19)$$

According to the voltage-current relationship equation of the capacitor C, the output voltage Vout of the triangular wave generating sub-unit 541 is expressed as the following equation 20:

$$V_{out(A)} = \frac{1}{C}\int I_C dt = \frac{1}{C}\int \frac{(V_{ref} - V_B)}{R_{12}}dt = \frac{1}{C}\left(\frac{V_{ref} - V_B}{R_{12}}\right)t \quad (20)$$

Figure 21:
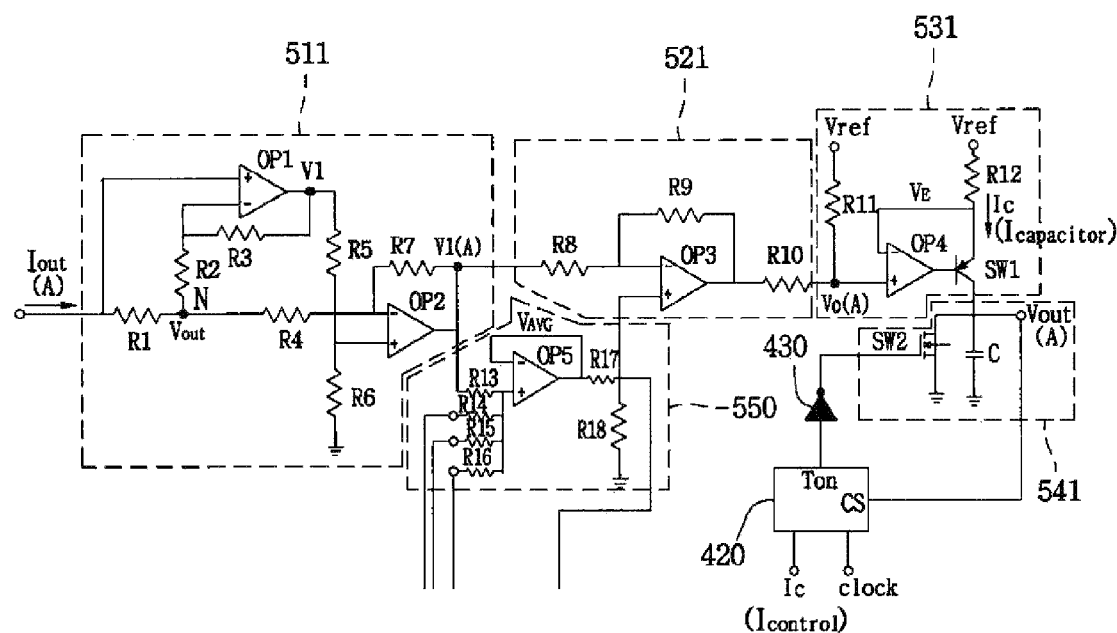
FIG. 21 is a circuit diagram showing a current balance control unit of the DC-DC converter including a triangular wave control unit according to the second embodiment.

FIG. 21 is a circuit diagram showing a current balance control unit of the DC-DC converter including a triangular wave control unit according to the second embodiment.

Referring to FIG. 21, as the capacitor C of the first triangular wave generating sub-unit 541 is charged, the voltage Vout(A) is increased. The triangular wave control unit 420 reads out the increasing voltage Vout and outputs the signal Ton having a low level when the voltage Vout reaches to the voltage value corresponding to the control current Ic, so that the second switch SW2 is turned on by the signal Ton provided through the inverter 430. When the second switch SW2 is turned on, the capacitor C is discharged. While the above-described operation is repeated, the triangular wave may be output to the terminal Vout.

According to the above-described relationship equations, when the sensing current of an arbitrary block is increased so that the sensing current is greater than the current average value of the sensing currents of all blocks, the value of the second output voltage Vo(A, B, C or D) is decreased, so that the gradient of the triangular wave of the triangular wave generating unit corresponding to the above is increased. Thus, the turn-on time of the switch device SW of the DC-DC converter 100 is decreased so that the current of the corresponding block is decreased. As the above-described operation is repeated, the output currents of all blocks are equal to each other. In addition, the second embodiment can be operated in the current continuous mode as well as the current discontinuous mode. That is, although the unstable operation scheme has been described, in which one block is operated in the current continuous mode and other blocks are operated in the current discontinuous mode when a DC-DC converter is operated in the current continuous mode, according to the second embodiment, since the output current of the DC-DC converter 100 is fed back to the DC-DC converter 100 such that the output currents may be balanced, all blocks are enabled to be operated in the current continuous mode.

In addition, the gradient of the triangular wave may be adjusted by sensing the currents of each block. In this case, it is possible to implement the used sensing resistor having about 1 mOhm.

When the resistance value of the first resistor R1 which is the sensing resistor is reduced, the power loss reduced is expressed as the following equation:

$$P_{loss} = I_{out}^2 \times R_1 = 62.5^2 \times 1 \times 10^{-3} = 3.9 \, [W]$$

Even when the first resistor R1 which is a sensing resistor is implemented to have a low resistance value, the sensing voltage is amplified by the first amplifier OP1 of the current sensing unit 510 and then, is amplified by the second amplifier OP2 in the differential amplification scheme once more while noise is removed. As described above, since the sensing voltage Vout is amplified through several stages, even if the sensing voltage has a low value, the sensing voltage can be sensed. Thus, the resistance value of the first resistor R1 is lowered so that the power consumed in sensing can be reduced.

In addition, in the current mode control scheme, the consumed sensing power is 62.5 W in the related art, but the consumed sensing power of the second embodiment is reduced to 3.9 W. Therefore, difficulty in selecting the sensing resistor corresponding to the high consuming power can be overcome.

Meanwhile, the second embodiment may be applicable to a converter capable of processing a high current and may be used for supplying power to many electronic components required in a home appliance. In detail, the second embodiment may be used for a power supply of an energy storage system (ESS) for supplying power, an ESS for a renewable power generation farm, an ESS for transmission/distribution, an ESS for a solar/wind generation farm, etc.

Specifically, the second embodiment may be applicable to a low-power battery charging system requiring a current of 10 A or less, a fuel cell, or an electric vehicle having a battery pack.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A DC/DC converter comprising:
   n converters, each converter comprising a first switch device, connected in parallel to each other and configured to adjust a level of an input voltage according to a duty ratio of a first pulse signal applied to the first switch device to output an output voltage, wherein the n is an integer of 2 or more; and
   a control unit configured to compare an average of n sensing currents with the n sensing currents sensed from the n converters, respectively, to adjust the duty ratio of the first pulse signal,
   wherein the control unit comprises:
   a current sensing unit configured to detect and amplify the n sensing currents and output n first output voltages;
   an average unit configured to average the n first output voltages and output an average voltage; and
   a current balance unit configured to compare the average voltage with the n first output voltages and output n second output voltages, wherein the duty ratio of the first pulse signal is adjusted by one of the n second output voltages,
   wherein the current sensing unit includes first to n-th current sensing sub-units each of which detects one of the n sensing currents and outputs one of the n first output voltages, and
   wherein each of the first to n-th current sensing sub-units comprises:
   a first amplifier configured to non-inverting amplify the sensing voltage;
   a second amplifier configured to amplify a differential signal between an output of the first amplifier and the sensing signal;
   a first resistor connected between a non-inverting terminal of the first amplifier and a node N, wherein the first resistor is one of sensing resistors;
   a second resistor connected between an inverting terminal of the first amplifier and the node N;
   a third resistor connected between an output terminal of the first amplifier and the inverting terminal of the first amplifier;
   a fourth resistor connected between the output terminal of the first amplifier and an inverting terminal of the second amplifier;
   a fifth resistor connected between the output terminal of the first amplifier and a non-inverting terminal of the second amplifier;
   a sixth resistor connected between the non-inverting terminal of the second amplifier and a ground; and
   a seventh resistor connected between the inverting terminal of the second amplifier and an output terminal of the second amplifier.

2. The DC/DC converter of claim 1, wherein the control unit further includes: a triangular wave generating unit configured to generate n triangular waves having gradients adjusted according to each of the n second output voltages.

3. The DC/DC converter of claim 1, wherein the current balance unit includes first to n-th current balance sub-units, and each of the first to n-th current balance sub-units compares the average voltage with one of the n first output voltages to output one of the n second output voltages.

4. The DC/DC converter of claim 3, wherein the triangular wave generating unit includes first to n-th triangular wave generating sub-units, and each of the first to n-th triangular wave generating sub-units outputs one of the n triangular waves which have a gradient according to a level of one of the n second output voltages.

5. The DC/DC converter of claim 4, wherein the control unit further includes:
   an error amplifier configured to compare each of the n output voltages of the n converters with a reference voltage and to amplify errors of the n output voltages to output the n control signals; and
   a comparator configured to compare one of the n control signals with one of the n triangular waves to control one of first switches of each of the n converters.

6. The DC/DC converter of claim 5, wherein the control unit further includes n constant current sources configured to provide mutually different currents according to each of the n second output voltages.

7. The DC/DC converter of claim 6, wherein the triangular wave generating unit includes:
   n capacitors charged with each of n constant currents output from each of the n constant current sources;
   n second switch devices configured to control a charge or a discharge of each of the n capacitors; and
   a triangular wave control unit configured to control the n second switch devices to be turned on or off.

8. The DC/DC converter of claim 7, wherein the triangular wave control unit controls one of the n second switch devices based on one of charged voltages of the n capacitors and one of the n control signals.

9. The DC/DC converter of claim 8, wherein the triangular wave is a voltage between both terminals of each of the n capacitor.

10. The DC/DC converter of claim 1, wherein all of the n converters are operated in current continuous mode or current discontinous mode.

11. A DC/DC converter comprising:
    a plurality of converters connected in parallel to each other and configured to adjust a level of an input voltage according to a duty ratio of a first pulse signal applied to a first switch device to output an output voltage;

current sensing units configured to amplify sensing voltages by output currents of the converters flowing through sensing resistors in order to output first output voltages; and current balance units configured to amplify a differential signal between an average voltage of the first output voltages and one of the first output voltages in order to output second output voltages, wherein the duty ratio of the first pulse signal is controlled according to levels of the second output voltages, wherein each of the current sensing units comprises:

a first amplifier configured to non-inverting amplify the sensing voltage;

a second amplifier configured to amplify a differential signal between an output of the first amplifier and the sensing signal;

a first resistor connected between a non-inverting terminal of the first amplifier and a node N, wherein the first resistor is one of the sensing resistors;

a second resistor connected between an inverting terminal of the first amplifier and the node N;

a third resistor connected between an output terminal of the first amplifier and the inverting terminal of the first amplifier;

a fourth resistor connected between the output terminal of the first amplifier and an inverting terminal of the second amplifier;

a fifth resistor connected between the output terminal of the first amplifier and a non-inverting terminal of the second amplifier;

a sixth resistor connected between the non-inverting terminal of the second amplifier and a ground; and a seventh resistor connected between the inverting terminal of the second amplifier and an output terminal of the second amplifier.

12. The DC/DC converter of claim 11, further comprising an averaging unit configured to generate the average voltage, wherein the average unit includes a buffer configured to average the first output voltages to output the average voltage.

13. The DC/DC converter of claim 11, wherein each of the current balance units includes a third amplifier configured to amplify a differential signal between an output voltage of the second amplifier and the average voltage.

14. The DC/DC converter of claim 13, further comprising a constant current source configured to output a constant current based on an output voltage of the third amplifier.

15. The DC/DC converter of claim 14, further comprising a triangular wave generating unit configured to generate a triangular wave by the current output from the constant current source.

16. The DC/DC converter of claim 15, wherein the duty ratio of the first pulse signal is controlled according to a gradient of the triangular wave output from the triangular wave generating unit.

17. The DC/DC converter of claim 15, wherein the triangular wave generating unit includes:

a capacitor charged with the current output from the constant current source;

a second switch device connected to the capacitor and configured to connect the capacitor to a ground to discharge the capacitor; and a triangular wave control unit configured to control the second switch device.

18. The DC/DC converter of claim 17, wherein the triangular wave control unit is configured to turn on or off the second switch device according to the charged voltage of the capacitor.

19. A power supply of an energy storage system including a DC-DC converter, in which the DC-DC converter comprises:

n converters, each converter comprising a first switch device, connected in parallel to each other and configured to adjust a level of an input voltage according to a duty ratio of a first pulse signal applied to the first switch device to output an output voltage, wherein the n is an integer of 2 or more; and a control unit configured to compare an average of n sensing currents with the n sensing currents sensed from the n converters, respectively, to adjust the duty ratio of the first pulse signal, wherein the control unit comprises:

a current sensing unit configured to detect and amplify the n sensing currents and output n first output voltages;

an average unit configured to average the n first output voltages and output an average voltage; and a current balance unit configured to compare the average voltage with the n first output voltages and output n second output voltages, wherein the duty ratio of the first pulse signal is adjusted by one of the n second output voltages, wherein the current sensing unit includes first to n-th current sensing sub-units each of which detects one of the n sensing currents and outputs one of the n first output voltages, and wherein each of the first to n-th current sensing sub-units comprises:

a first amplifier configured to non-inverting amplify the sensing voltage;

a second amplifier configured to amplify a differential signal between an output of the first amplifier and the sensing signal;

a first resistor connected between a non-inverting terminal of the first amplifier and a node N, wherein the first resistor is one of sensing resistors;

a second resistor connected between an inverting terminal of the first amplifier and the node N;

a third resistor connected between an output terminal of the first amplifier and the inverting terminal of the first amplifier;

a fourth resistor connected between the output terminal of the first amplifier and an inverting terminal of the second amplifier;

a fifth resistor connected between the output terminal of the first amplifier and a non-inverting terminal of the second amplifier;

a sixth resistor connected between the non-inverting terminal of the second amplifier and a ground; and a seventh resistor connected between the inverting terminal of the second amplifier and an output terminal of the second amplifier.

20. A method for controlling a DC/DC converter, the DC/DC converter comprised of a plurality of converters connected in parallel, current sensing units and current balance units, the method comprising the steps of:

adjusting, by the plurality of converters, a level of an input voltage according to a duty ratio of a first pulse signal applied to a first switch device to output an output voltage;

amplifying, by the current sensing units, sensing voltages by output currents of the converters flowing through sensing resistors in order to output first output voltages; and amplifying, by the current balance units, a differential signal between an average voltage of the first output voltages and one of the first output voltages in order to output second output voltages, wherein the duty ratio of the first pulse signal is controlled according to levels of the second output voltages, and wherein each of the current sensing units comprises:

a first amplifier configured to non-inverting amplify the sensing voltage;

a second amplifier configured to amplify a differential signal between an output of the first amplifier and the sensing signal;

a first resistor connected between a non-inverting terminal of the first amplifier and a node N, wherein the first resistor is one of the sensing resistors;

a second resistor connected between an inverting terminal of the first amplifier and the node N;

a third resistor connected between an output terminal of the first amplifier and the inverting terminal of the first amplifier;

a fourth resistor connected between the output terminal of the first amplifier and an inverting terminal of the second amplifier;

a fifth resistor connected between the output terminal of the first amplifier and a non-inverting terminal of the second amplifier;

a sixth resistor connected between the non-inverting terminal of the second amplifier and a ground; and a seventh resistor connected between the inverting terminal of the second amplifier and an output terminal of the second amplifier.

\* \* \* \* \*